US012110727B2

(12) United States Patent
Hass

(10) Patent No.: US 12,110,727 B2
(45) Date of Patent: Oct. 8, 2024

(54) REVERSIBLE DOOR SYSTEM WITH GEARED LINKAGES

(71) Applicant: ASSA ABLOY Accessories and Door Controls Group, Inc., Monroe, NC (US)

(72) Inventor: Brian D. Hass, Monroe, NC (US)

(73) Assignee: ASSA ABLOY Accessories and Door Controls Group, Inc., Monroe, NC (US)

( * ) Notice: Subject to any disclaimer, the term of this patent is extended or adjusted under 35 U.S.C. 154(b) by 0 days.

(21) Appl. No.: 17/899,216

(22) Filed: Aug. 30, 2022

(65) Prior Publication Data

US 2023/0067945 A1 Mar. 2, 2023

Related U.S. Application Data

(60) Provisional application No. 63/239,692, filed on Sep. 1, 2021.

(51) Int. Cl.
*E05F 15/70* (2015.01)
*E05F 15/63* (2015.01)

(52) U.S. Cl.
CPC ......... *E05F 15/63* (2015.01); *E05Y 2201/422* (2013.01); *E05Y 2201/434* (2013.01);
(Continued)

(58) Field of Classification Search
CPC ............. E05Y 2600/45; E05Y 2600/46; E05Y 2600/626; E05Y 2800/17; E05Y 2800/113;
(Continued)

(56) References Cited

U.S. PATENT DOCUMENTS 6,435,804 B1 8/2002 Hutchins
6,742,303 B2 * 6/2004 Pedemonte ........... E05F 15/622 49/344

(Continued)

FOREIGN PATENT DOCUMENTS

CN 104442978 A * 3/2015
DE 8612331 U1 8/1986

(Continued)

OTHER PUBLICATIONS

ASSA ABLOY Access and Egress Hardware Group, Inc., International Patent Application No. PCT/US2022/042173, International Search Report and Written Opinion, Jan. 4, 2023.

(Continued)

*Primary Examiner* — Jerry E Redman
(74) *Attorney, Agent, or Firm* — Moore & Van Allen PLLC; Jeffrey R. Gray

(57) ABSTRACT

A door system having a linkage assembly with a drive arm and an attendant arm coupled at the ends through a gear joint. The gear joint has drive teeth on an end of the drive arm and attendant teeth on an end of the attendant arm. The drive arm is coupled to a motor in the door system that is coupled to a door, or a door frame or a wall. The attendant arm is coupled to the opposite of the door, or the door frame or the wall to which the door system is coupled. When the door system is installed on the push side or the pull side of the door the drive arm and the attendant arm are parallel with the door and the upper door frame. During operation the motor transfers the torque from the motor through the gear joint to open the door.

20 Claims, 19 Drawing Sheets

(52) U.S. Cl.
CPC ... *E05Y 2201/624* (2013.01); *E05Y 2201/712* (2013.01); *E05Y 2400/612* (2013.01); *E05Y 2600/45* (2013.01); *E05Y 2600/46* (2013.01); *E05Y 2600/626* (2013.01); *E05Y 2800/17* (2013.01); *E05Y 2900/132* (2013.01)

(58) Field of Classification Search
CPC ......... E05Y 2800/205; E05Y 2800/232; E05Y 2800/236; E05F 1/10
USPC ......... 49/339, 340, 341, 342, 345, 246, 247, 49/248, 249
See application file for complete search history.

(56) References Cited

U.S. PATENT DOCUMENTS

| | | | | |
|---|---|---|---|---|
| 8,322,080 | B2 * | 12/2012 | Treihaft | E05F 15/63 49/141 |
| 8,695,163 | B2 * | 4/2014 | Roberts | E05F 3/221 16/49 |
| 11,761,251 | B2 * | 9/2023 | Shepherd | E05D 15/46 49/340 |
| 11,846,133 | B2 * | 12/2023 | Plummer | E05F 15/63 |
| 2005/0129490 | A1 | 6/2005 | Hutchins | |
| 2007/0051046 | A1 * | 3/2007 | Yoshida | E05F 15/63 49/340 |
| 2009/0265992 | A1 * | 10/2009 | Hass | E05F 15/63 318/610 |
| 2014/0165329 | A1 | 6/2014 | Wildfrster | |
| 2014/0325911 | A1 * | 11/2014 | Hass | E05F 3/224 49/31 |
| 2015/0113876 | A1 * | 4/2015 | Burris | E05F 3/102 49/31 |
| 2017/0002594 | A1 * | 1/2017 | Carrier | E05F 11/16 |
| 2018/0155968 | A1 * | 6/2018 | Miu | E05F 15/70 |
| 2021/0238904 | A1 * | 8/2021 | Eickhoff | E05F 3/222 |
| 2022/0220785 | A1 | 7/2022 | Thompson | |
| 2023/0067945 | A1 * | 3/2023 | Hass | E05F 15/75 |

FOREIGN PATENT DOCUMENTS

| | | | | |
|---|---|---|---|---|
| DE | 3602718 | A1 | * | 8/1987 |
| DE | 3615200 | A1 | * | 11/1987 |
| DE | 102022004404 | B3 | * | 10/2023 |
| EP | 2732117 | B1 | | 5/2019 |
| GB | 2080407 | A | | 2/1982 |
| KR | 101901401 | B1 | | 9/2018 |

OTHER PUBLICATIONS

ASSA ABLOY Access and Egress Hardware Group, Inc., International Patent Application No. PCT/US2022/042173, International Preliminary Report on Patentability, Mar. 14, 2024.

* cited by examiner

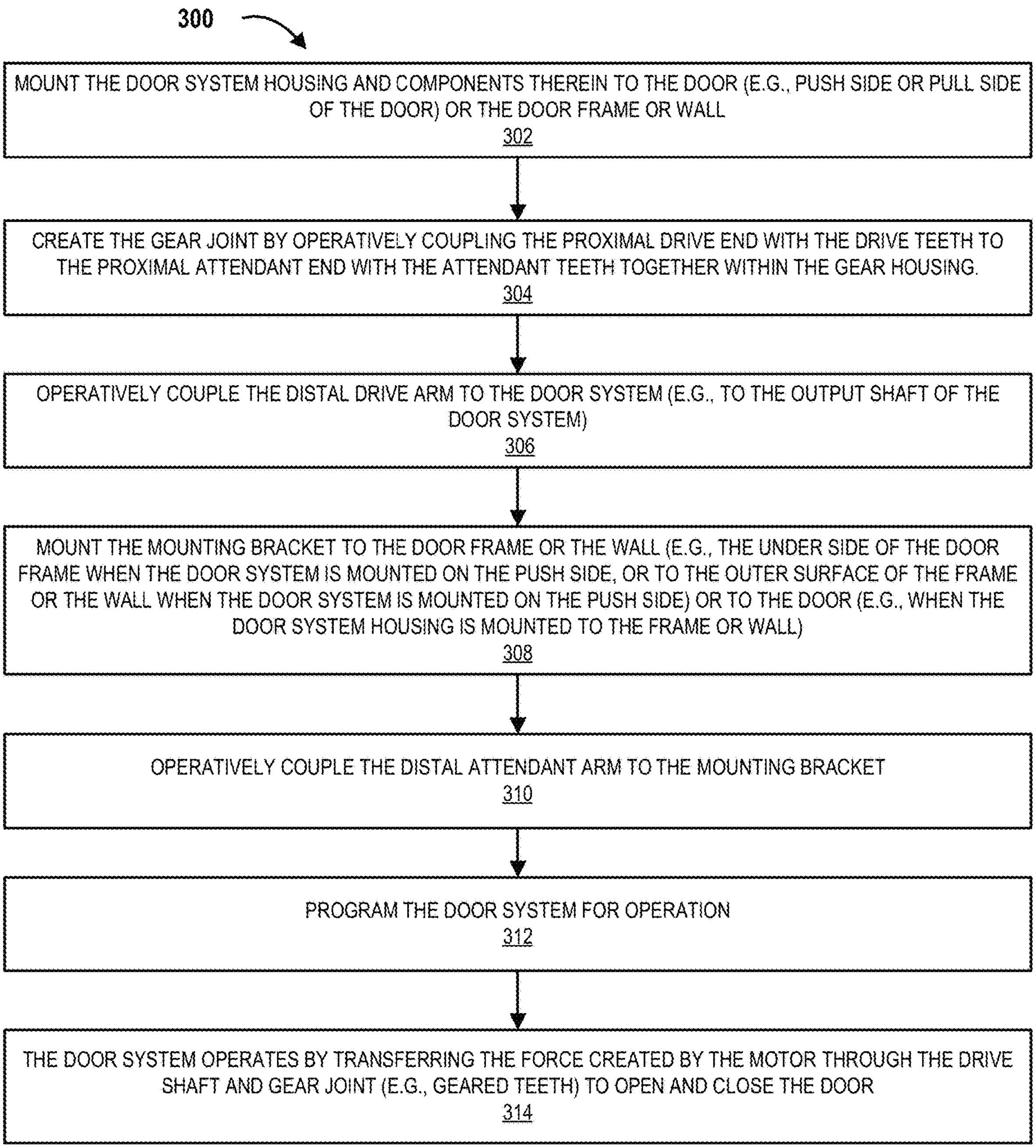
*FIG.* 23

REVERSIBLE DOOR SYSTEM WITH GEARED LINKAGES

CROSS REFERENCE AND PRIORITY CLAIM UNDER 35 U.S.C. § 119

This application claims priority to U.S. Provisional Application No. 63/239,692 entitled "Reversible Door System with Geared Linkages" filed on Sep. 1, 2021, which is assigned to the assignee hereof and the entirety of which is incorporated by reference herein.

FIELD

The present invention relates to door systems that allow for improved installation and operation, and more particularly, to door systems with improved linkage arms that allow for improved installation and operation.

BACKGROUND

Door systems may include door operators, door closers, or other like systems that control or aid in the operation of opening and/or closing a door. A door operator is a device that is able to open and/or close a door or other barrier, or that aids in opening and/or closing a door or other barrier. Door operators typically include a motor that is connected to a door via a linkage to control motion of the door. Door operators come in a variety of styles and configurations. Alternatively, door closers may only be used to close a door or aid in closing a door. Door closers may have motors, springs, or other features for closing a door. There is a need for improved door systems that can be installed and operate more efficiently.

SUMMARY

The door system herein has a linkage assembly, which may comprise of a drive arm (otherwise described as a main arm or first arm) and an attendant arm (otherwise described as a secondary arm or a second arm). The drive arm may comprise a proximal drive end and a distal drive end. The proximal drive end may comprise a plurality of drive gear teeth. The attendant arm may comprise a proximal attendant end and a distal attendant end. The proximal attendant end of the attendant arm may comprise a plurality of attendant gear teeth, which are configured for operative coupling with the drive gear teeth of the proximal drive end of the drive arm. The drive gear teeth and the attendant gear teeth between the drive arm and the attendant arm form a gear joint that facilitates (e.g., allows, enables, or the like) the transfer of torque from the drive system of the door system to the door, door frame, or wall to allow for improved opening and closing of a door. Moreover, the gear joint allows the linkage arms to be arranged parallel to each other and/or the door frame and/or door, and/or when the door is closed to create a lower profile for the door system.

An embodiment of the invention comprises a door system that is operatively coupled to a door, a door frame, or a wall. The door system comprises a door system housing, a motor located at least partially within the door system housing, and a linkage assembly. The linkage assembly comprising a drive arm having a distal drive end and a proximal drive end, wherein the proximal drive end has drive teeth. The linkage assembly further comprising an attendant arm having a distal attendant end and a proximal attendant end, wherein the proximal attendant end has attendant teeth. The drive teeth and the attendant teeth are operatively coupled together in a gear joint. The distal drive end of the drive arm is operatively coupled to the motor, and the distal attendant end of the attendant arm is operatively coupled to the door, the door frame, or the wall.

In further accord with embodiments, when the door system is operatively coupled to a push side of the door the distal attendant end of the attendant arm is operatively coupled to the door frame.

In other embodiments, when the door system housing is operatively coupled to a pull side of the door the distal attendant end of the attendant arm is operatively coupled to the door frame or the wall.

In still other embodiments, when the door housing is operatively coupled to the door frame or the wall, the distal attendant end of the attendant arm is operatively coupled to the door.

In yet other embodiments, the door system is operatively coupled for left hand swing or right hand swing of the door.

In other embodiments, the drive arm or the attendant arm has a pivot joint for vertical movement at any location on the drive arm or the attendant arm.

In further accord with embodiments, the distal attendant end of the attendant arm has a ball joint that is operatively coupled to a mounting bracket.

In other embodiments, at least a portion of the drive arm is angled adjacent the distal drive end to allow for alignment of at least another portion of the drive arm and the attendant arm when the door is closed.

In still other embodiments, at least a portion of the drive arm and the attendant arm are parallel when the door is closed.

In yet other embodiments, the gear joint allows the door to open past 90 degrees open.

In other embodiments, the gear joint comprises a gear housing having a base housing and a cover housing. The gear joint further comprising a first bearing operatively coupled within a proximal drive aperture in the proximal drive end of the drive arm, and a second bearing operatively coupled within a proximal attendant aperture in the proximal attendant end of the attendant arm. The gear joint further comprising a first pin operatively coupled to the gear housing and the proximal drive aperture of the drive arm, and a second pin operatively coupled to the gear housing and the proximal attendant aperture of the attendant arm.

In further accord with embodiments, the drive teeth and the attendant teeth are chevron teeth, linear teeth, or angular teeth.

In other embodiments, the door system further comprises a mounting bracket operatively coupled to the door frame or the wall, wherein the distal attendant end of the attendant arm is operatively coupled to the mounting bracket, and wherein the mounting bracket is mounted on an outer face of the frame or the wall when the door system is operatively coupled to a pull side of the door.

In still other embodiments, the door system further comprises a mounting bracket operatively coupled to the door frame or the wall, wherein the distal attendant end of the attendant arm is operatively coupled to the mounting bracket, and wherein the mounting bracket is mounted on a lower face of the door frame when the door system is operatively coupled to a push side of the door.

Another embodiment of the invention comprises a door assembly having a door frame, a door operatively coupled to the door frame, and a door system operatively coupled to the door, the door frame, or a wall. The door system comprises a door system housing, a motor located at least partially within the door system housing, and a linkage assembly. The linkage assembly comprises a drive arm having a distal drive end and a proximal drive end, wherein the proximal drive end has drive teeth. The linkage assembly further comprises an attendant arm having a distal attendant end and a proximal attendant end, wherein the proximal attendant end has attendant teeth. The drive teeth and the attendant teeth are operatively coupled together in a gear joint. The distal drive end of the drive arm is operatively coupled to the motor and the distal attendant end of the attendant arm is operatively coupled to the door, the door frame, or the wall.

In further accord with embodiments, at least a portion of the drive arm is angled adjacent the distal drive end to allow for parallel alignment of at least another portion of the drive arm and the attendant arm when the door is closed.

Another embodiment of the invention comprises a method of mounting a door system. The door system comprises a door system housing, a motor located at least partially within the door system housing, and a linkage assembly. The linkage assembly comprises a drive arm having a distal drive end and a proximal drive end, wherein the proximal drive end has drive teeth. The linkage assembly further comprises an attendant arm having a distal attendant end and a proximal attendant end, wherein the proximal attendant end has attendant teeth. The drive teeth and the attendant teeth are operatively coupled together in a gear joint. The distal drive end of the drive arm is operatively coupled to the motor, wherein the door system is operatively coupled to a door, or a door frame or a wall. The distal attendant end of the attendant arm is operatively coupled to the other of the door, or the door frame or the wall. The method comprises mounting the door housing to the door or the door frame or the wall. The method further comprises mounting the distal attendant arm of the linkage assembly having the gear joint to the opposite of the door or the door frame or the wall.

In further accord with embodiments, at least a portion of the drive arm is angled adjacent the distal drive end to allow for parallel alignment of at least another portion of the drive arm and the attendant arm when the door is closed.

Another embodiment of the invention comprises a method of operating a door system. The door system comprises a door system housing, a motor located at least partially within the door system housing, and a linkage assembly. The linkage assembly comprises a drive arm having a distal drive end and a proximal drive end, wherein the proximal drive end has drive teeth. The linkage assembly further comprises an attendant arm having a distal attendant end and a proximal attendant end, wherein the proximal attendant end has attendant teeth. The drive teeth and the attendant teeth are operatively coupled together in a gear joint. The distal drive end of the drive arm is operatively coupled to the motor, wherein the door system is operatively coupled to a door, or a door frame or a wall, and the distal attendant end of the attendant arm is operatively coupled to the other of the door, or the door frame or the wall. The method comprises activating the motor to provide a force, and transferring the force of the motor through the gear joint to open or close the door.

In further accord with embodiments of the invention, at least a portion of the drive arm is angled adjacent the distal drive end to allow for parallel alignment of at least another portion of the drive arm and the attendant arm when the door is closed.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

The following drawings illustrate embodiments of the invention and are not necessarily drawn to scale, wherein:

FIG. 23 is a process flow for installing and operating the door system, in accordance with some embodiments of the present disclosure.

DETAILED DESCRIPTION

Embodiments of the present invention may now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Figure 1:
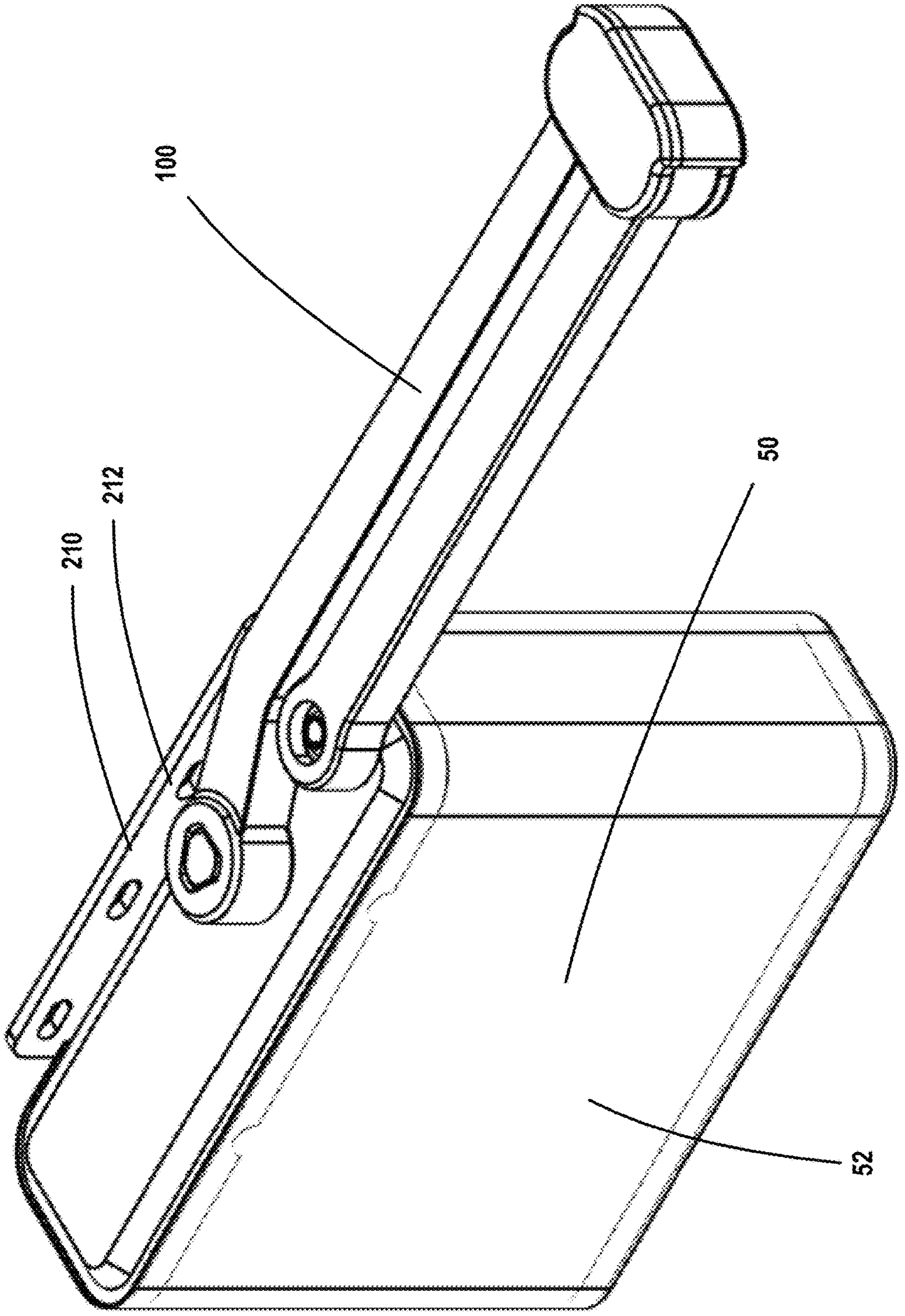
FIG. 1 is a perspective side view of a door system, in accordance with some embodiments of the present disclosure.
Figure 2:
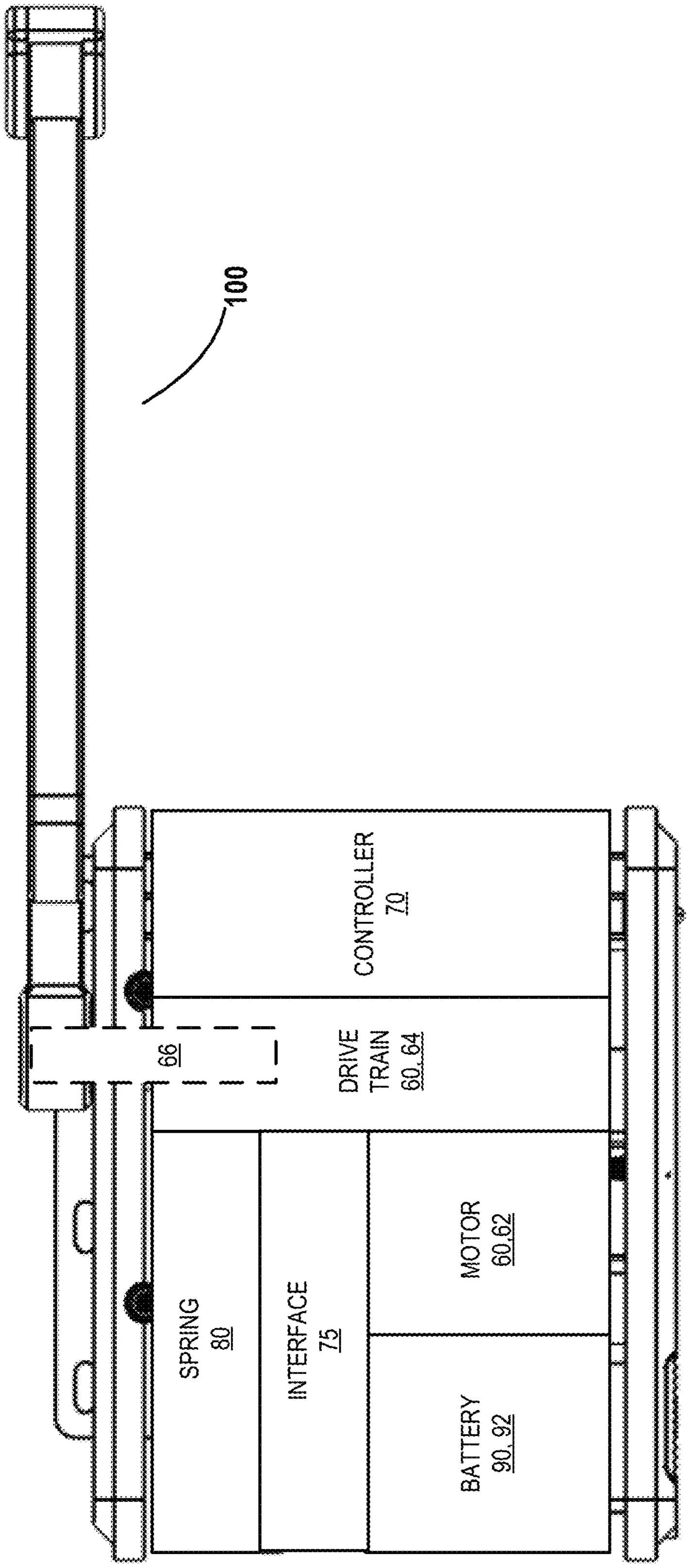
FIG. 2 is a side view of the door system of FIG. 1 with the door system housing removed, in accordance with some embodiments of the present disclosure.

FIGS. 1 and 2 illustrate a door system 50, which may comprise a door operator or a door closer. FIG. 2 illustrates a door operator with the housing removed. The door system may comprise a door system housing 52, which at least partially or completely covers the components of the door system 50. The door system 50 may comprise a drive assembly 60 (otherwise described as a motor assembly), a controller 70, an interface 75 (e.g., interface board), a spring assembly 80, a power source 90 (e.g., a battery 92), or the like operatively coupled together. The door system 50 further comprises a linkage assembly 100 operatively coupled to the drive assembly 60 (e.g., a motor 62, a drive train 64, drive shaft 66, or the like). As will be described in further detail herein, the door system 50 and the linkage assembly 100 are operatively coupled to the door 10, the door frame 20, or the wall 30.

As illustrated in FIG. 2, the power to the door system 50 is applied to the motor assembly 60, and in particular the motor 62, through the use of the power source 90, in particular one or more batteries 92. However, in other embodiments the power may be applied through wired power. The operation of the door system 50, in particular the motor 62, is achieved by the controller 70, such as through the use of an integral magnetic, optical, or the like encoder. The operating parameters (e.g., speed, acceleration, duration, when to open/close lock, or the like, communication with other components around the door, or the like) of the door system 50 may be input/output through the interface 75 (e.g., screen, controls, buttons, switches, or the like), such that the controller 70 that operates the door system 50 may be programed through the use of the interface 75. As illustrated in FIG. 2, the drive assembly 60 comprises a motor 62, a drive train 64 (e.g., a gear train), and an output drive unit 66 (e.g., drive shafts, or the like). The drive train 64 may include the use of gears (e.g., spur, helical, or the like), shafts, pullies, belts, chains, or the like. The drive shaft may be configured for operatively coupling with the linkage assembly 100, as will be described in further detail herein.

The power source 90 may include a self-contained power storage pack, comprising one or more batteries 92, high capacity capacitors, or alternative power storage. It should be understood that in some embodiments the door system 50 may comprise wired power (e.g., hardwired, plugged into an outlet, or the like). As such, in some embodiments, the power source 90 comprises low voltage power, such as through the power storage pack or transformer plugged into an outlet, or both (e.g., battery backup to a wired installation). It should be understood that the door system 50 of the present disclosure may be used in accordance with a manual door that occasionally uses automated activation (e.g., sensor detection, push plate, remote control, assisted entry, or the like) such that the energy used to operate the door manually (e.g., a user pushing or pulling the door) is recaptured and used to recharge the power source 90. For example, this allows the power source 90 (e.g., storage pack, such as one or more batteries 92) to be charged without having to remove and replace the power source 90. However, if replacement of the one or more batteries 92 is needed, the one or more batteries 92 are removeable and replaceable through the door system housing 52.

Moreover, the door system 50 may include a spring assembly 80. The spring assembly 80 may comprise a spring and an eccentric that is used to load the spring and provide torque to close the door, which offers the ability to control the force profile of the door (e.g., force to open or close the door). As such, the eccentric may be operatively coupled to the output drive unit 66 (e.g., drive shaft). As such, as the output drive unit 66 is rotated, the eccentric may compress one or more springs (e.g., two-nested helical compression springs, or the like). The linear force of the spring(s) results in a torque in the closing direction on the output drive unit 66. By modifying the profile of the eccentric, the torque on the door can be controlled to be a constant through the range of door motion. Alternatively, the profile of the eccentric can be modified to provide increased torque near the closed position of the door as is often desired to ensure proper door closing in conditions where there is wind or stack pressures which tend to push the door 10 open. This provides for a smooth manual opening feel to the user and ensures reliable closing of the door. In alternate embodiments, clock type springs may be used in the spring assembly 80. However, by making the profile of the eccentric symmetrical, the door system 50 can be used in either direction and allows for use of the same door system 50 on either a left or a right hand door. The spring force may be adjusted by a spring adjustment set screw when the door system 50 is installed, by the control of a secondary motor when the door is installed, or the like. As such, the present invention allows for spring adjustment whereas other door systems require the door arms to be repositioned, the housing to be opened for access, and/or the door operator to be removed from the header to adjust the spring force. The spring assembly 80 absorbs energy when the door is opened and stores that energy for later use in closing the door 10, which is typically required to allow the door to close when no power is supplied to the door system 50, such as in the case of power failure. Each time the door is opened by a person, energy is applied to the door and stored in the spring assembly 80, the stored energy being then released to close the door 10.

In alternate embodiments, the motor 62 may be used as a generator, in that the excess energy released by the spring assembly 80 may be recaptured to be stored in the power pack (e.g., battery 92). As such, each manual cycle may be used to recharge the power source 90. Alternatively, when the present door system 50 is battery powered and able to capture energy on the open cycle by using the motor 62 as a generator, it is possible to use the power source 90 to temporarily store the power, instead of the spring assembly 80. The energy can then be released into the motor 62 to close the door 10. In such an alternative embodiment, the door system 50 need not comprise any spring assembly 80, which reduces the number of parts required.

The door system 50 of the present disclosure may incorporate a controller 70 that is used to set or change the operating parameters, and to operate the door system 50. The controller 70 can monitor (e.g., constantly, intermittently, or the like), directly and/or through the use of sensors, the operating parameters (e.g., door speed, position, force, acceleration, or the like) such that if the door begins to move faster than a predetermined speed, the motor 62 may be used as a generator to remove the energy from the door and slow the door down. This allows the energy to be absorbed over relatively long period of time and dramatically reduces the forces on the door when the full-open position is reached, as opposed to a traditional door system using a stop to absorb impact energy upon the full-open position. The excess energy may be used to recharge the power source 90. Moreover, the drive assembly 60 allows gaining energy from a manual opening of the door. Since the controller 70 monitors the speed of the door, any excess energy applied by a user to the door can be stored in the power source 90, as a way to eliminate this excess energy from rapid manual opening, which reduces the stress and wear on door system 50.

In some the embodiment the door system 50 may fully open and close the door; however, the door system 50 may also be used as a power assisted door opener, by supplying only enough power to the door to reduce the force required to open the door. The force of the door operator, in a power-assisted mode, is controlled by the amount of current supplied to the motor 52. The amount of current is determined in an initial set up of the door to be below the amount of current required to open the door under power for example. Activation of the power assist function may occur when the encoder indicates motion of the door has started. Alternatively, power assist may be provided by adding measuring of the backlash between the drive arm 110 and the motor 62. When pressure is applied to the door and the backlash is taken up, the controller 70 applies power to the door, and, if the backlash is increased, indicating the door is stopped, power may be removed.

Figure 3:
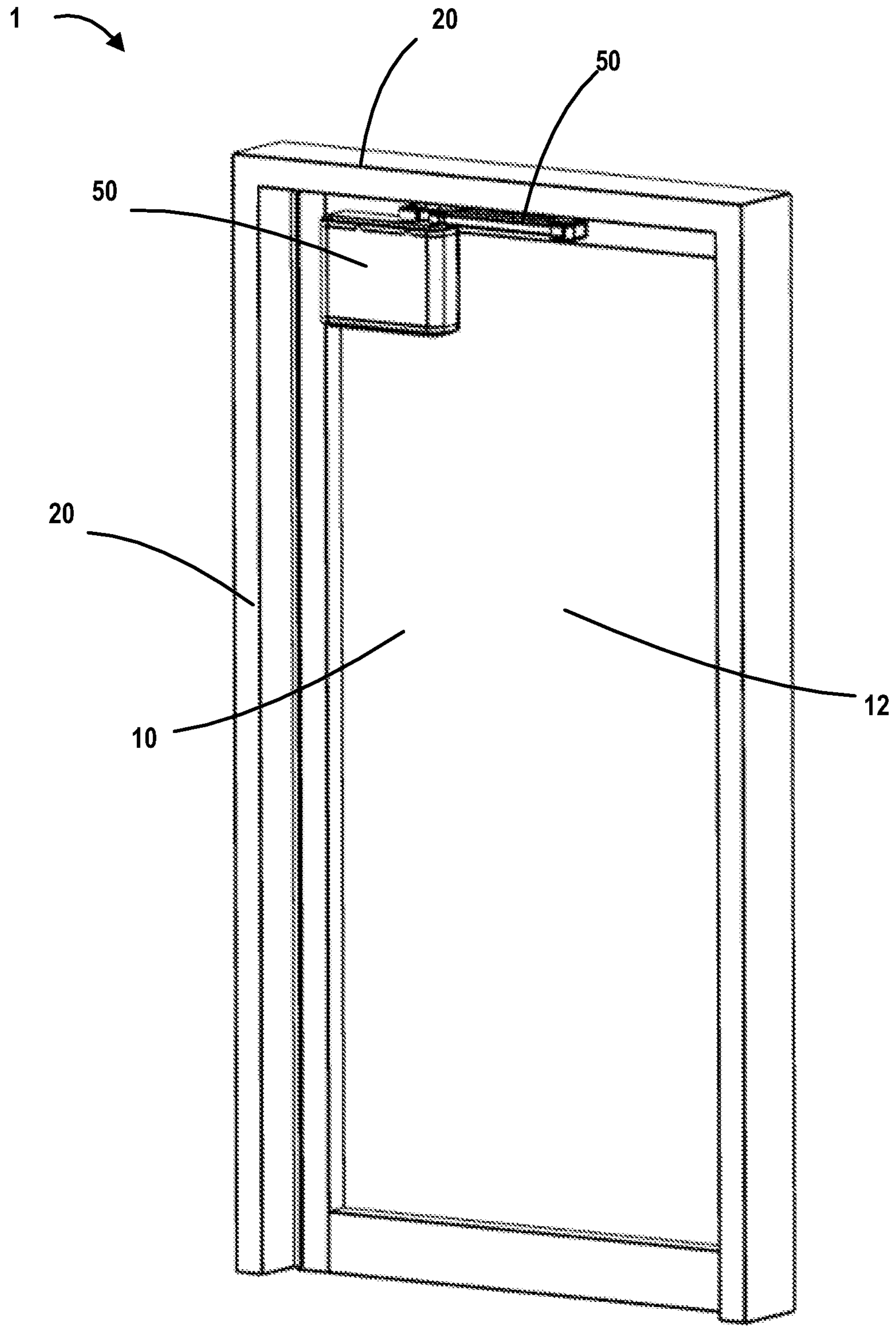
FIG. 3 is a perspective view of a door assembly with a door system installed on a push side of a door, in accordance with some embodiments of the present disclosure.
Figure 4:
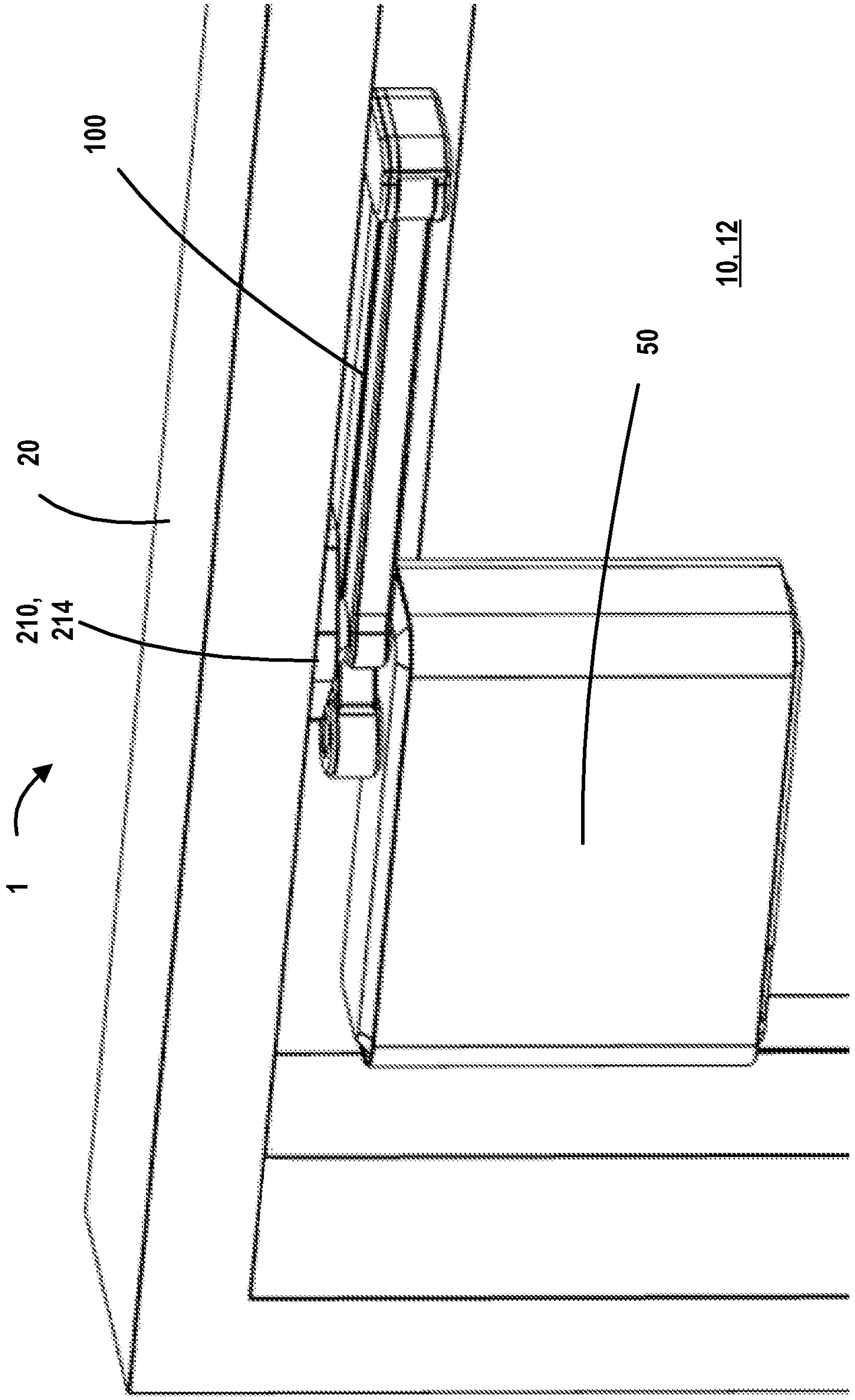
FIG. 4 is an enlarged perspective view of the door system of FIG. 3.
Figure 5:
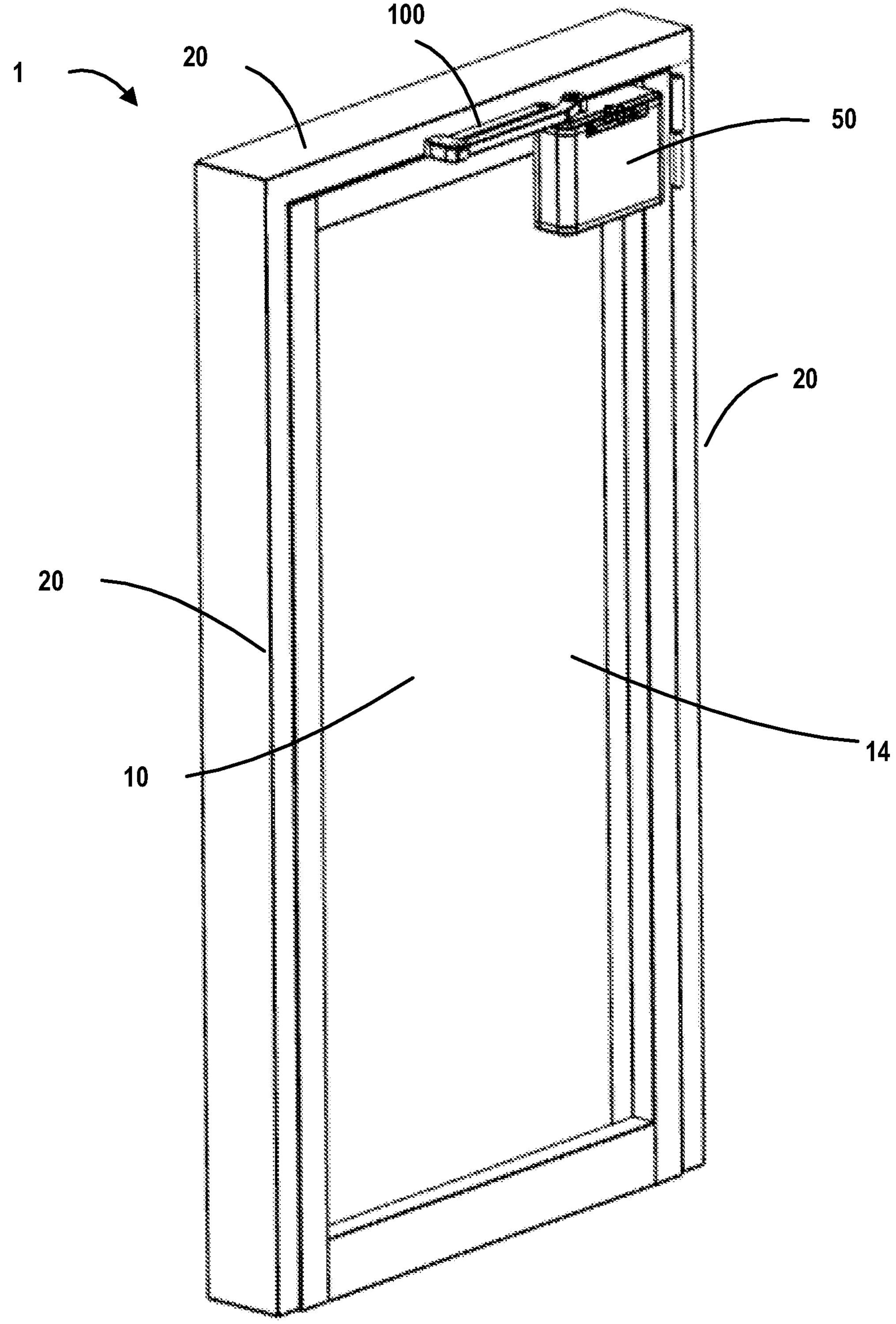
FIG. 5 is a perspective view of an assembly with a door system installed on a pull side of a door, in accordance with some embodiments of the present disclosure.
Figure 6:
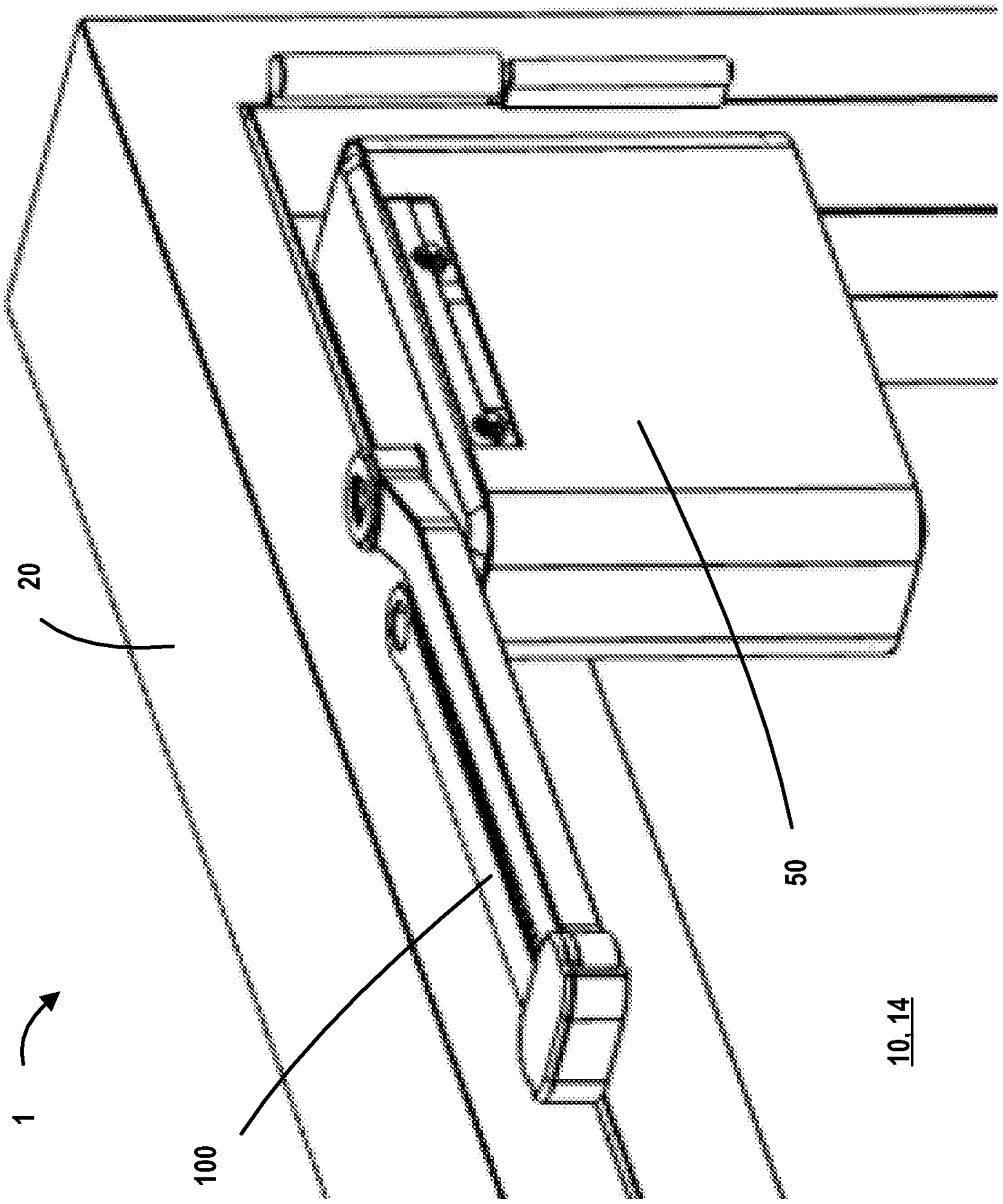
FIG. 6 is an enlarged perspective view of the door system of FIG. 5.
Figure 7:
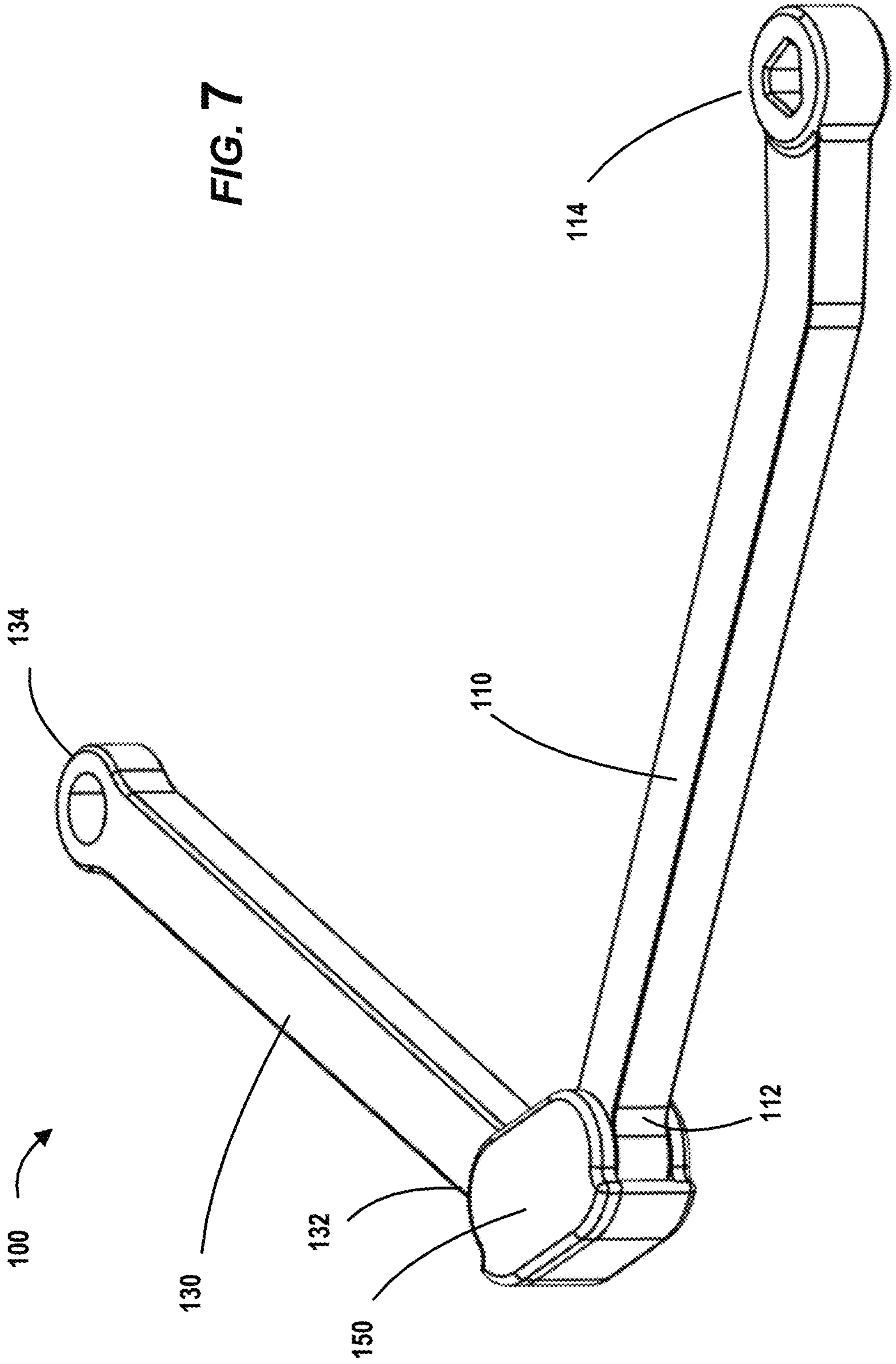
FIG. 7 is a top perspective view of the linkage assembly of the door system, in accordance with some embodiments of the present disclosure.
Figure 8:
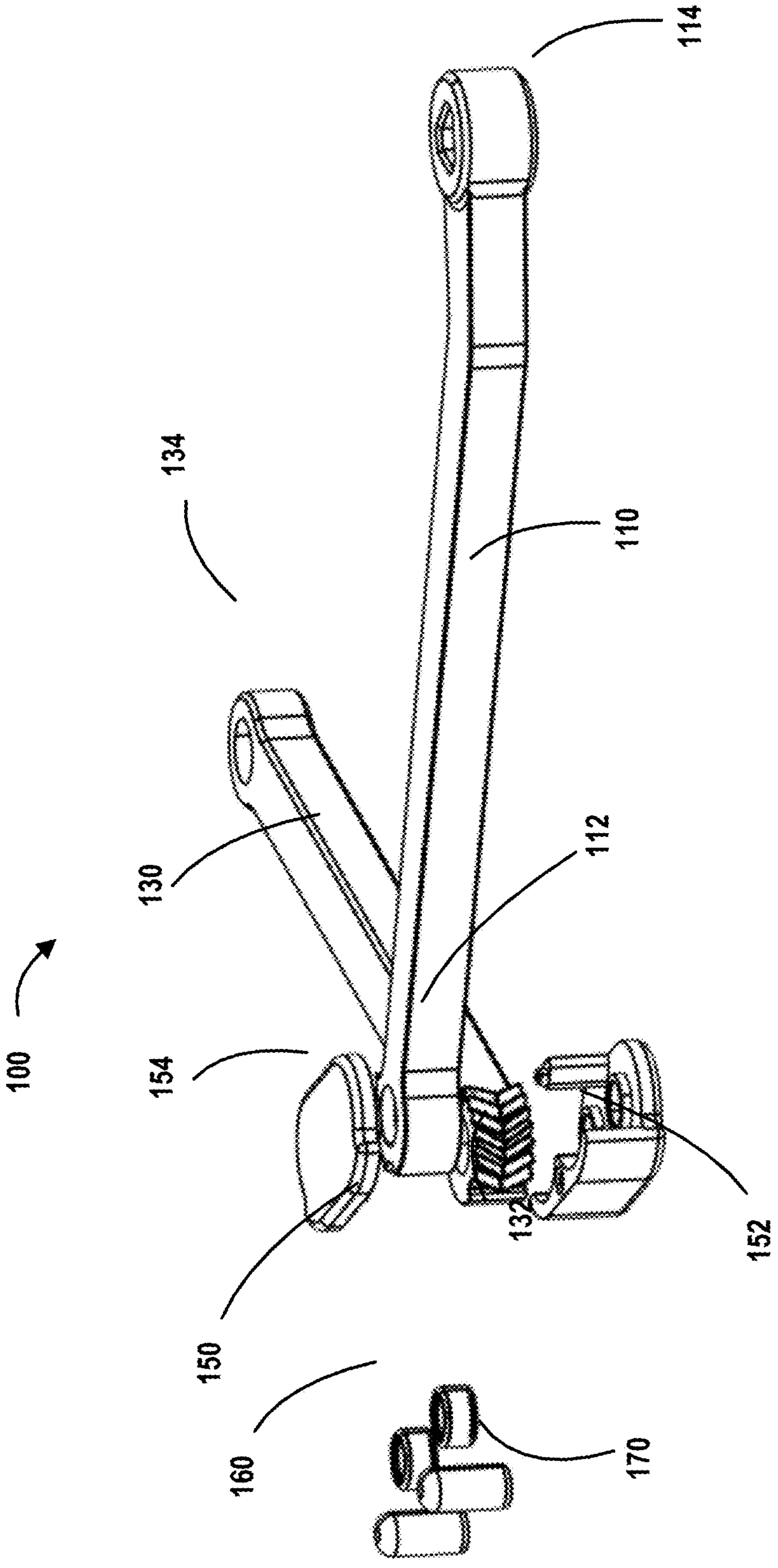
FIG. 8 is a top exploded perspective view of the linkage assembly of the door system, in accordance with some embodiments of the present disclosure.
Figure 9:
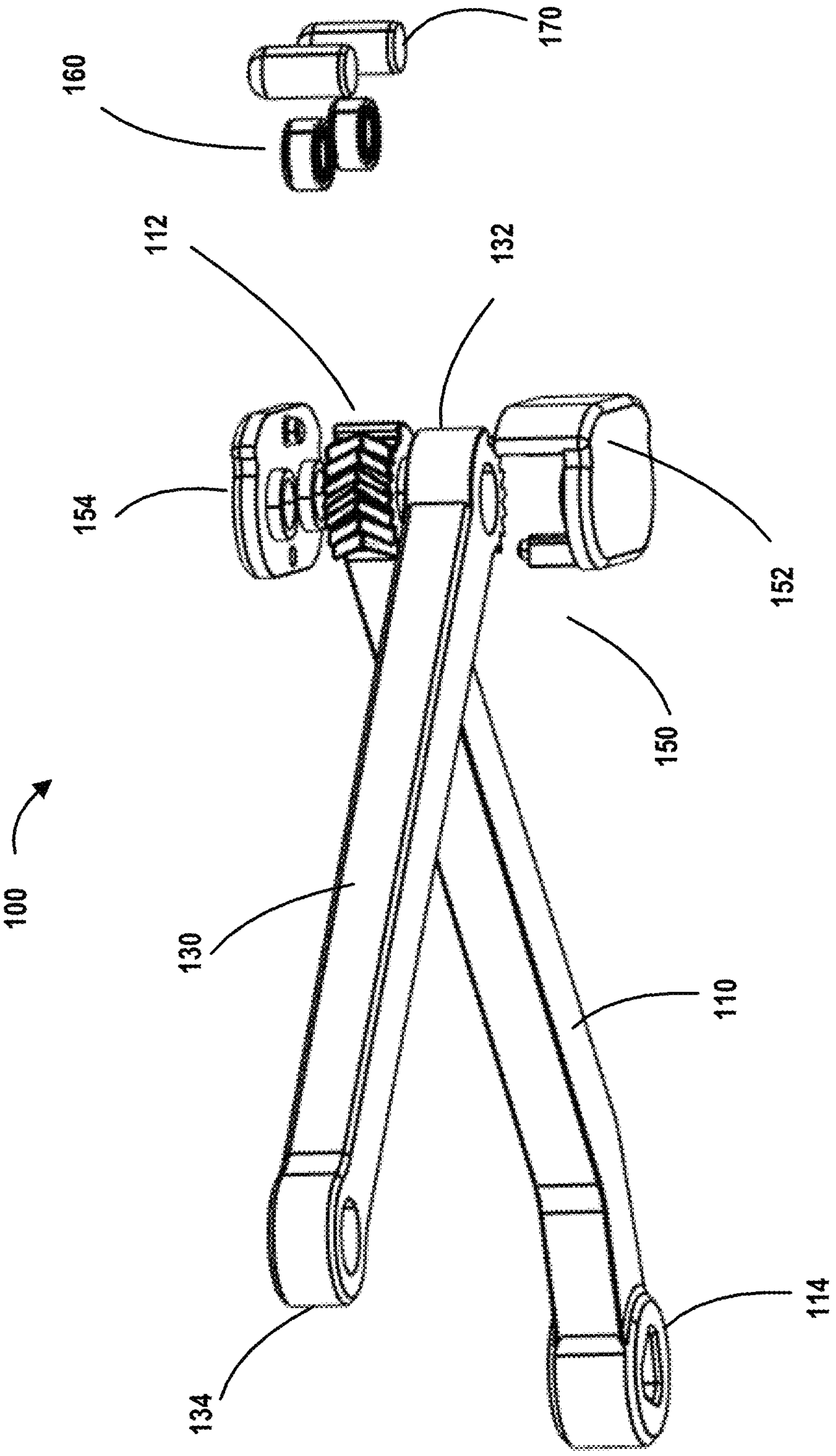
FIG. 9 is a bottom exploded perspective view of the linkage assembly of the door system, in accordance with some embodiments of the present disclosure.
Figure 10:
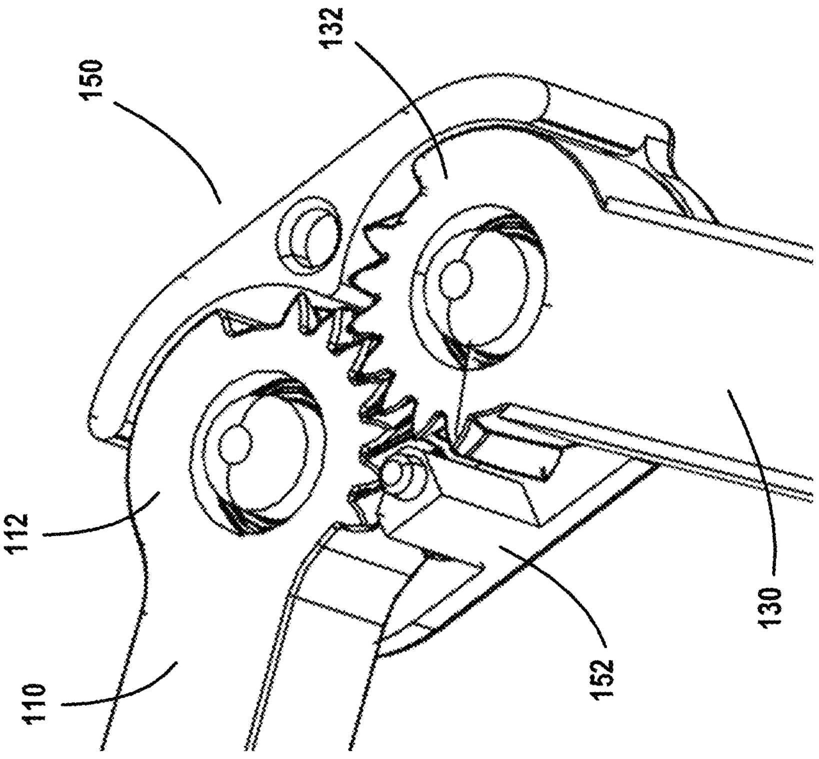
FIG. 10 is an enlarged perspective view of the gear housing base of the linkage assembly of the door system with the gear cover removed, in accordance with some embodiments of the present disclosure.
Figure 11:
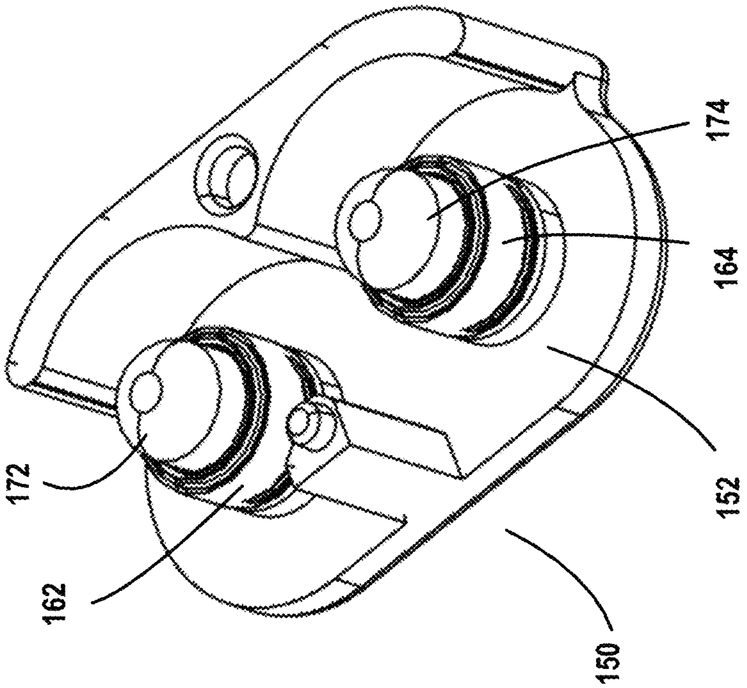
FIG. 11 is an enlarged perspective view of the gear housing base of the linkage assembly of the door system with the cover and linkage arms removed, in accordance with some embodiments of the present disclosure.
Figures 12, 13:
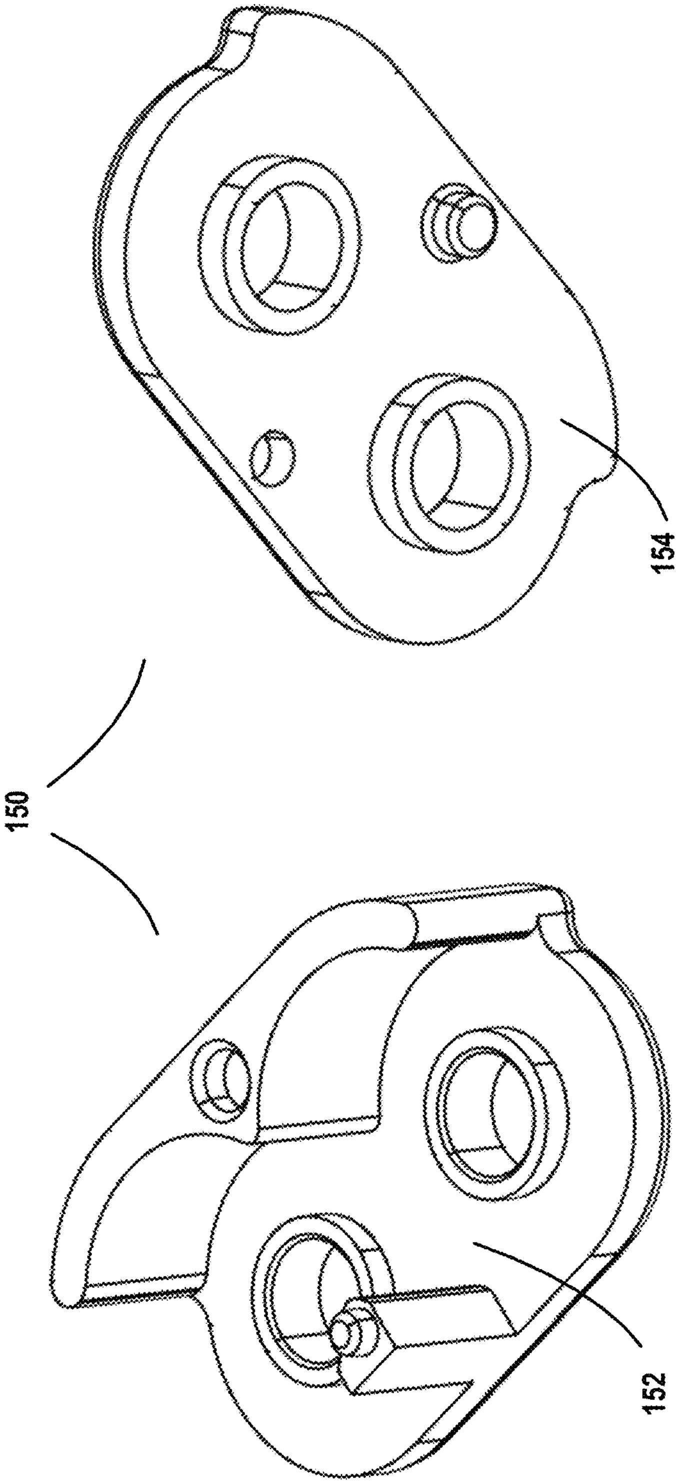
FIG. 12 is an enlarged perspective view of the gear housing base of the linkage assembly of the door system, in accordance with some embodiments of the present disclosure.
FIG. 13 is an enlarged perspective view of the gear housing cover of the linkage assembly of the door system, in accordance with some embodiments of the present disclosure.
Figure 14:
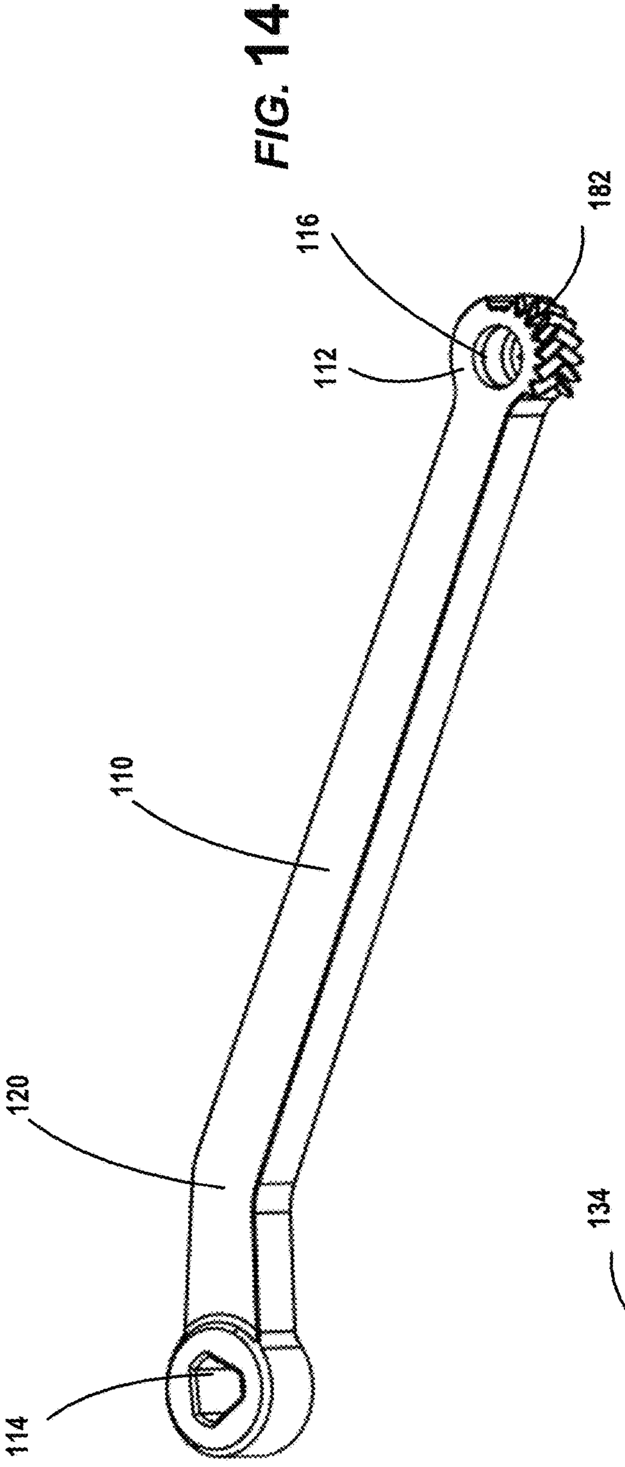
FIG. 14 is a perspective view of a drive arm of the linkage assembly of the door system, in accordance with some embodiments of the present disclosure.
Figure 15:
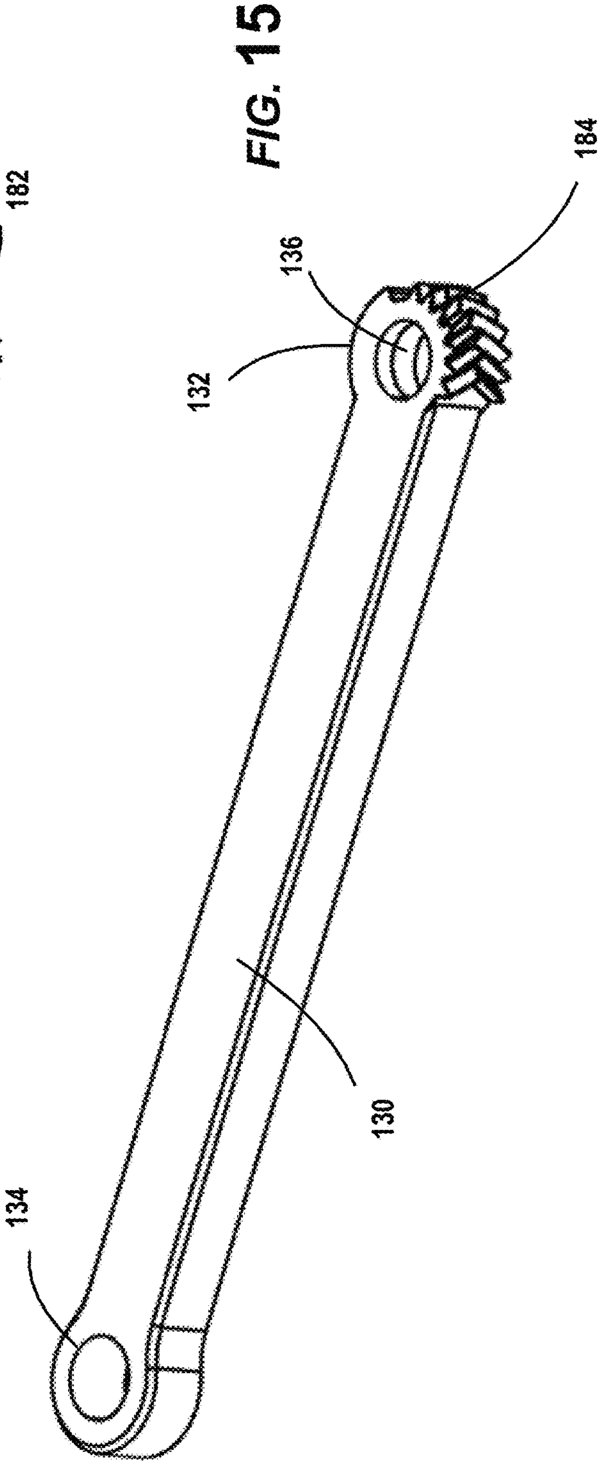
FIG. 15 is a perspective view of an attendant arm of the linkage assembly of the door system, in accordance with some embodiments of the present disclosure.
Figure 16:
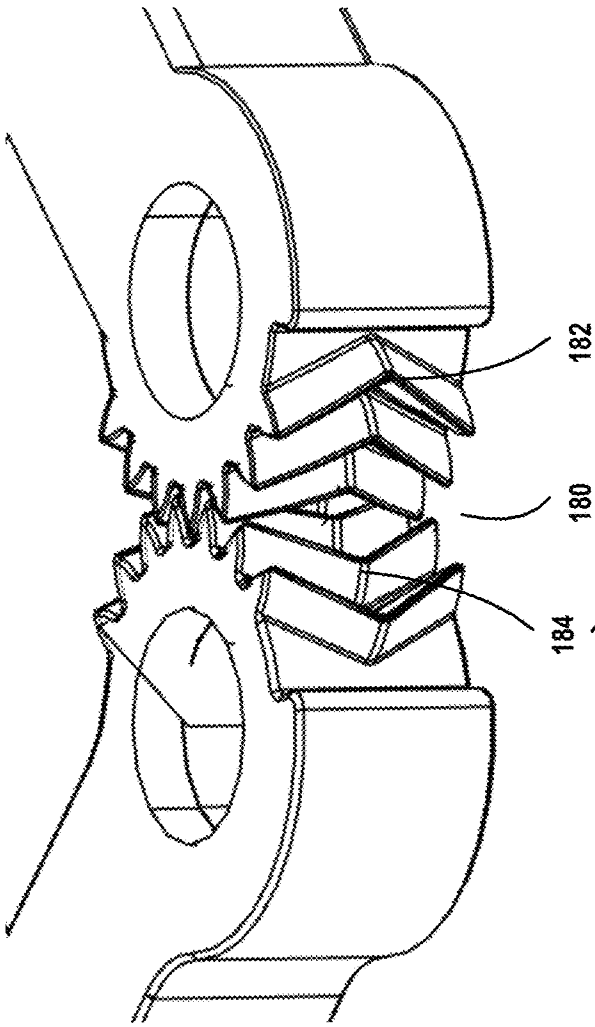
FIG. 16 is an outer perspective view of the coupling of the first arm and second arm of the linkage assembly, in accordance with some embodiments of the present disclosure.
Figure 17:
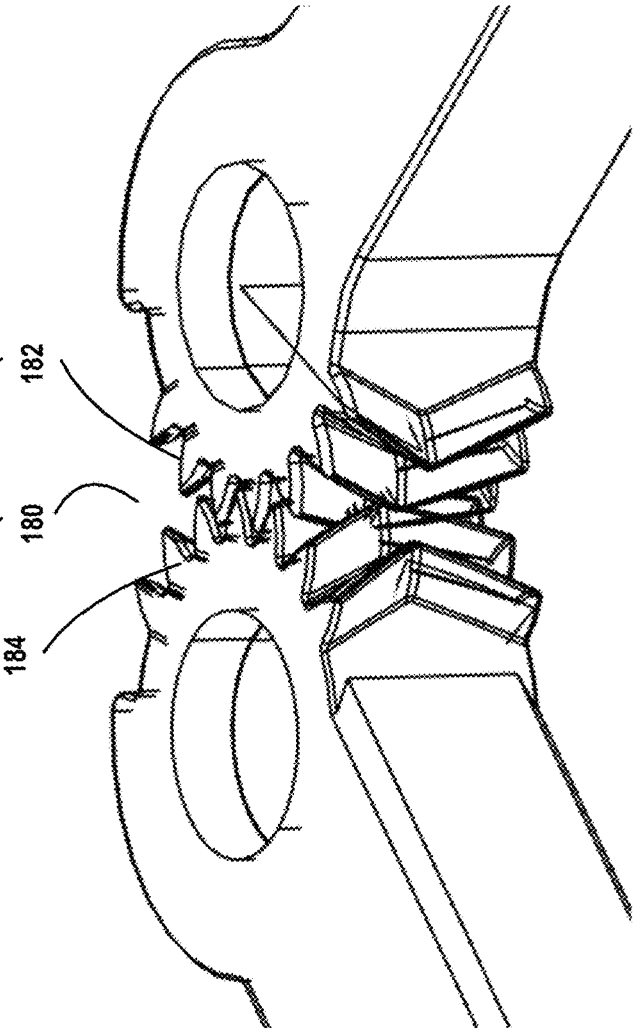
FIG. 17 is an inner perspective view of the coupling of the first arm and second arm of the linkage assembly, in accordance with some embodiments of the present disclosure.

FIGS. 3 through 6 illustrate a door assembly 1 that comprises a door 10, a door frame 20, a wall 30, and a door system 50 (e.g., door operator, door closer, or the like). As illustrated in FIGS. 3 and 4 the door system 50 may be operatively coupled to a push side 12 of the door 10. However, as illustrated in FIGS. 5 and 6 the door system 50 may be operatively coupled to a pull side 14 of the door 10, as will be discussed in further detail herein. Regardless of the installation of the door system 50 on the push side 12 of the door 10 or the pull side 14 of the door 10, the linkage assemble 100 of the present discloser allows the arms (e.g., the drive arm 110 and the attendant arm 130) to be installed parallel with the door system 50 and/or the door 10 when the door 10 is in the closed position. Moreover, the linkage assembly 100, in particular, the gear joint 150 of the linkage assembly allows the torque applied by the drive assembly 60 more efficiently through the linkage system, as will be described herein.

FIGS. 7 through 21 illustrate the linkage assembly 100 of the door system 50, which may comprise of a drive arm 110 (otherwise described as a main arm or first arm) and an attendant arm 130 (otherwise described as a secondary arm or a second arm). The drive arm 110 may comprise a proximal drive end 112 and a distal drive end 114. The proximal drive end 112 may comprise a plurality of gear teeth 180 (e.g., a plurality of linear gear teeth, helical gear teeth, chevron gear teeth, or the like teeth), such as drive gear teeth 182. The attendant arm 130 may comprise a proximal attendant end 132 and a distal attendant end 134. The proximal attendant end 132 of the attendant arm 130 may comprise a plurality of gear teeth 180, such as attendant gear teeth 184, which are configured for operative coupling with the drive gear teeth 182 of the proximal drive end 112 of the drive arm 110. Moreover, the proximal drive end 112 may have a proximal drive end aperture 116 in which a first bearing 162 is located. The proximal attendant end 132 may have a proximal drive end aperture 136 in which a second bearing 164 is located.

The gear joint 150 may have a gear joint housing 152 comprising a base housing 154 and a cover housing 156. The gear joint 150 may further comprise one or more pins 170, such as a first pin 172 and a second pin 174 for operatively coupling with the gear joint housing 152 (e.g., to the base housing 154, between the base housing 154 and cover housing 156, to the cover housing 156, or the like). As illustrated in FIGS. 10 through 17, at least a portion of the proximal drive end 112 of the drive arm 110 and at least a portion of the proximal attendant end 132 of the attendant arm 130 is at least partially located within the gear joint housing 152. Moreover, the pins 170 (e.g., first pin 172, second pin 174, or the like) may extend at least partially within the end apertures (e.g., the proximal drive end aperture 116, the proximal attendant end aperture 136, or like), such as within the bearings 160 (e.g., the first bearing 162, the second bearing 164). As such, the drive gear teeth 182 on the proximal drive end 112 of the drive arm 110 may interlock with the attendant gear teeth 184 on the proximal attendant end 132 of the attendant arm 130 such that the drive arm 110 may transfer all of its force (e.g., torque) to the attendant arm 130 through the attendant gear teeth 184. The gear joint housing 152, such as the base housing 154 and the cover housing 156 aids in preventing movement of the proximal drive end 112 and the proximal attendant end 132 with respect to each other (e.g., prevents separation, sliding, or the like), protects the teeth 180 from debris (e.g., dirt, dust, or the like) that could damage the teeth 180, prevents injury to users during operation, or the like.

Figure 18:
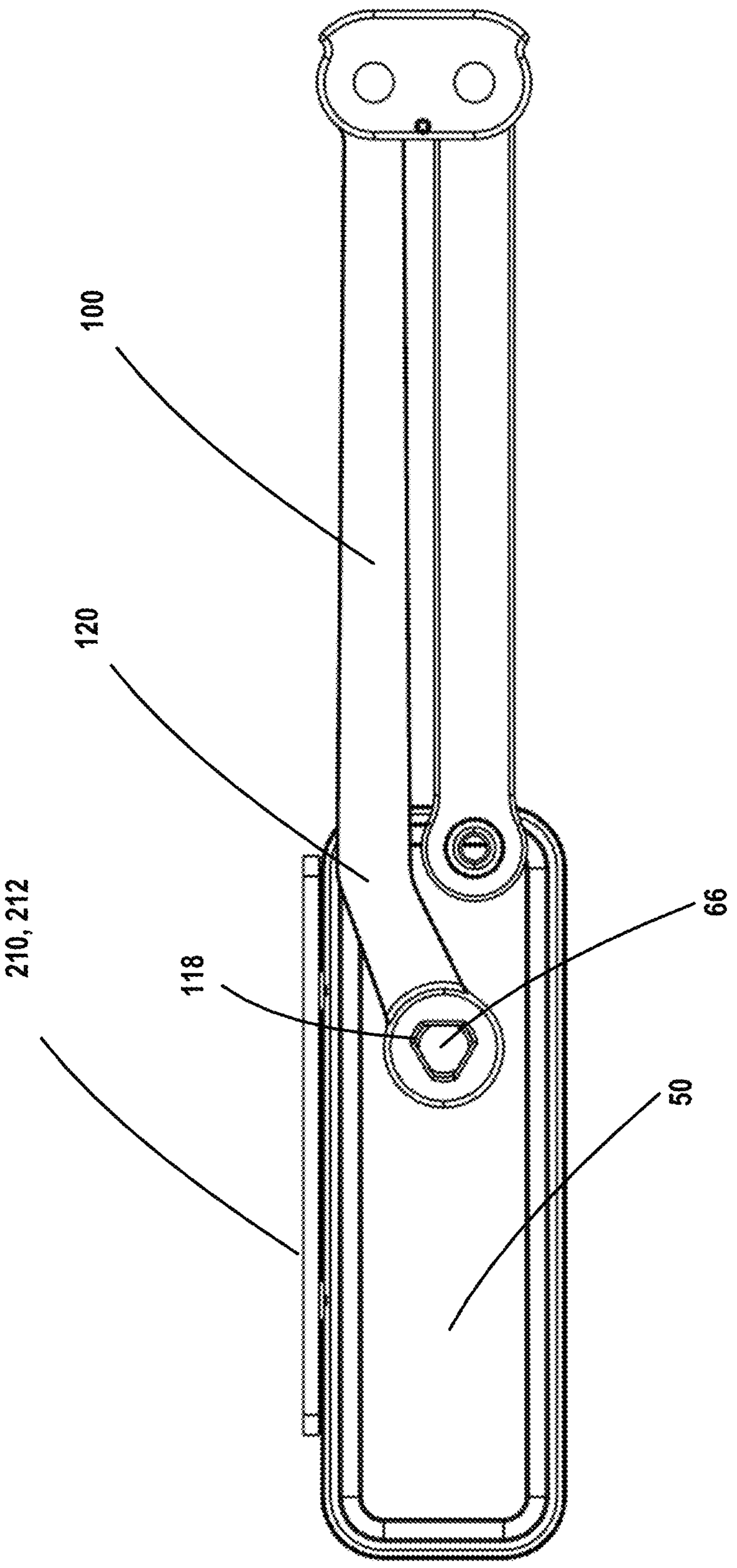
FIG. 18 is a top view of the door system in a closed position, in accordance with some embodiments of the present disclosure.

It should be understood that in order to allow for improved installation (e.g., mounting of the door system 50 on the push side 12 or the pull side 14 of the door 10), to aid in reducing the profile of the door system 50 (e.g., the distance the door system 50 extends off of the door 10), and/or for allowing use of the same arms regardless of installation position, one of the arms 110, 130 may include a bend 120 (otherwise described as an arm angle). For example, as illustrated in the figures, the bend 120 may be located adjacent the distal drive end 114 of the drive arm 110. Moreover, as illustrated in FIG. 18, the drive arm 110 may have a length that is longer than the attendant arm 130. In this way, the drive arm 110 (e.g., at least a portion of the drive arm, such as the majority of the drive arm) and the attendant arm 130 may be parallel with each other and/or located in the same plane (e.g., horizontal plane) when the door 10 is closed. Furthermore, FIG. 18 illustrates that the bend 120 in the drive arm 110 may allow at least a portion of the width of the attendant arm 130 to be nested within a portion of the drive arm 110. In other embodiments of the invention, the bend 120 may be located on the attendant arm 130 (e.g., and the drive arm may be offset from the width of the door systems 50). As further illustrated in FIG. 18, when the door 10 is in the closed position, the arms 110, 130 may both be located within the width of the door housing 52 of the door system 50. As such, the door system 50 may be located within a smaller envelop when compared to conventional door systems that require the arms to be oriented at angles with respect to each other for mounting on different sides of the door.

Returning to FIGS. 3 and 4, the door system 50 may be operatively coupled to a push side 12 of the door 10 (e.g., directly or through the use of a housing mounting bracket 212). In this configuration, the door system 50 is operatively coupled to the door 10, while the distal attendant end 134 of the attendant arm 130 is operatively coupled to the door frame 20 (e.g., the underside of the door frame) through the use of an arm mounting bracket 214 (see FIGS. 4 and 19). Returning to FIGS. 5 and 6, the door system 50 may be operatively coupled to a pull side 14 of the door 10. When the door system 50 is operatively coupled to a pull side 14 of the door 10, the distal attendant end 134 of the attendant arm 130 is operatively coupled to the door frame 20 (e.g., outer surface of the door frame) or the wall 30 through the use of an arm mounting bracket 214. It should be understood that the arm mounting brackets 214 for mounting on the push side 12 or the pull side 14 of the door may be the same or different arm mounting brackets. For example, the different arm mounting brackets 214 may be used, or the same mounting bracket 214 may be used but may be installed in a different way (e.g., a different orientation). In alternate embodiments, when the door system 50 is operatively coupled to the door frame 20 or the wall 30, the distal attendant end 134 of the attendant arm 130 is operatively coupled to the door 10 (not illustrated in the figures). As illustrated in FIGS. 4 and 6, regardless of the side of the door 10 on which the door system 50 is mounted, the drive arm 110 and the attendant arm 130 may not require any orientation change and/or swapping out of the drive arm 110 or attendant arm 130.

FIGS. 3 and 6 illustrate that the door system 50 is mounted for a left hand swinging door 10. However, it should be understood that the door system 50 may also be mounting for right hand swinging doors (not illustrated). When mounted for right hand swinging doors, the illustrated linkage arms 110, 130 need only be rotated along the longitudinal axis of the linkage arms 110, 130 (e.g., 180 degrees). In some embodiments, the gear housing 52 (e.g., base housing 54, cover housing 56) may also have to be rotated (e.g., 180 degrees) for installation.

Figure 19:
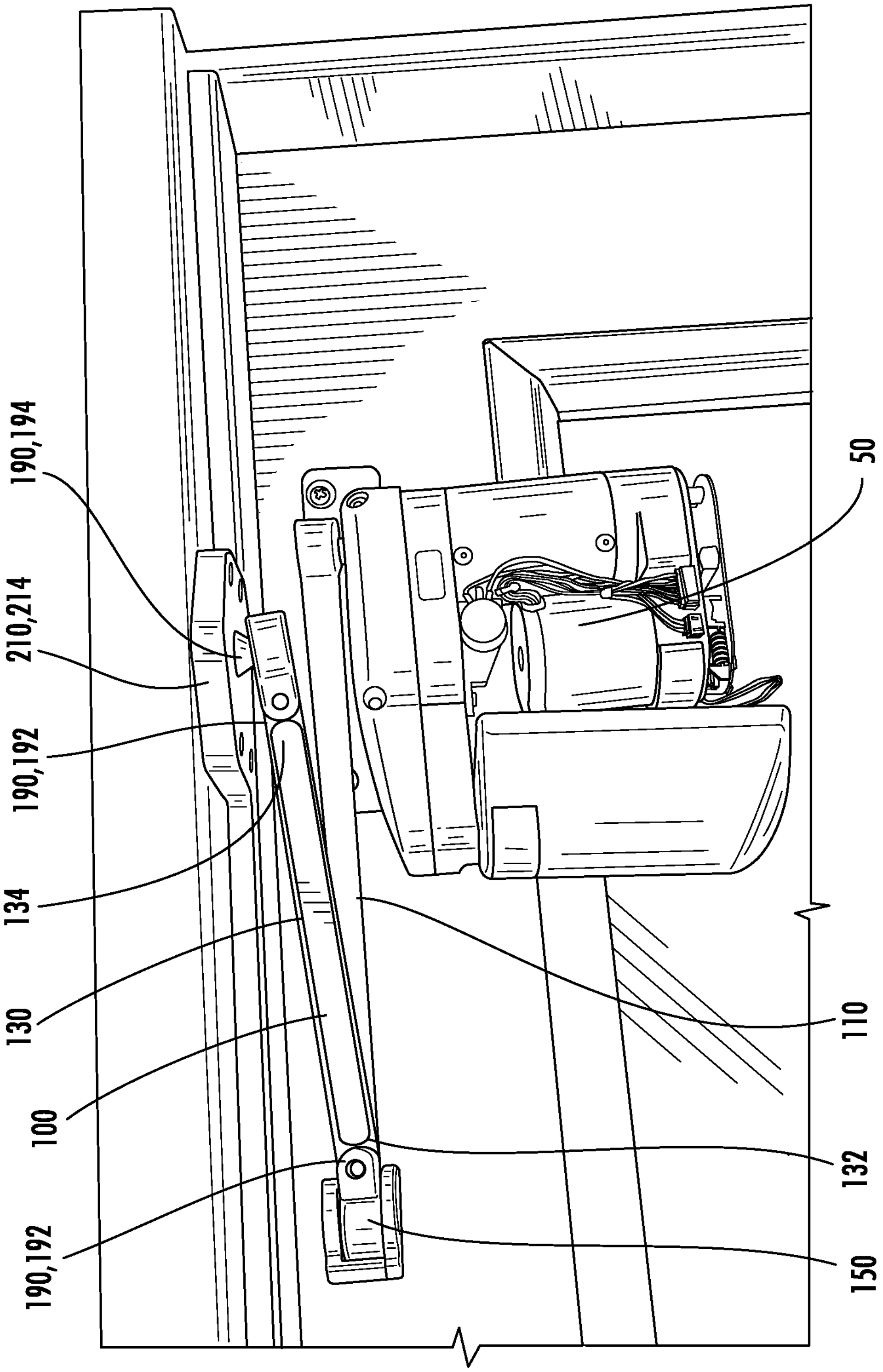
FIG. 19 is a perspective view of the door system installed on a closed door using one or more alignment joints, in accordance with some embodiments of the present disclosure.
Figure 20:
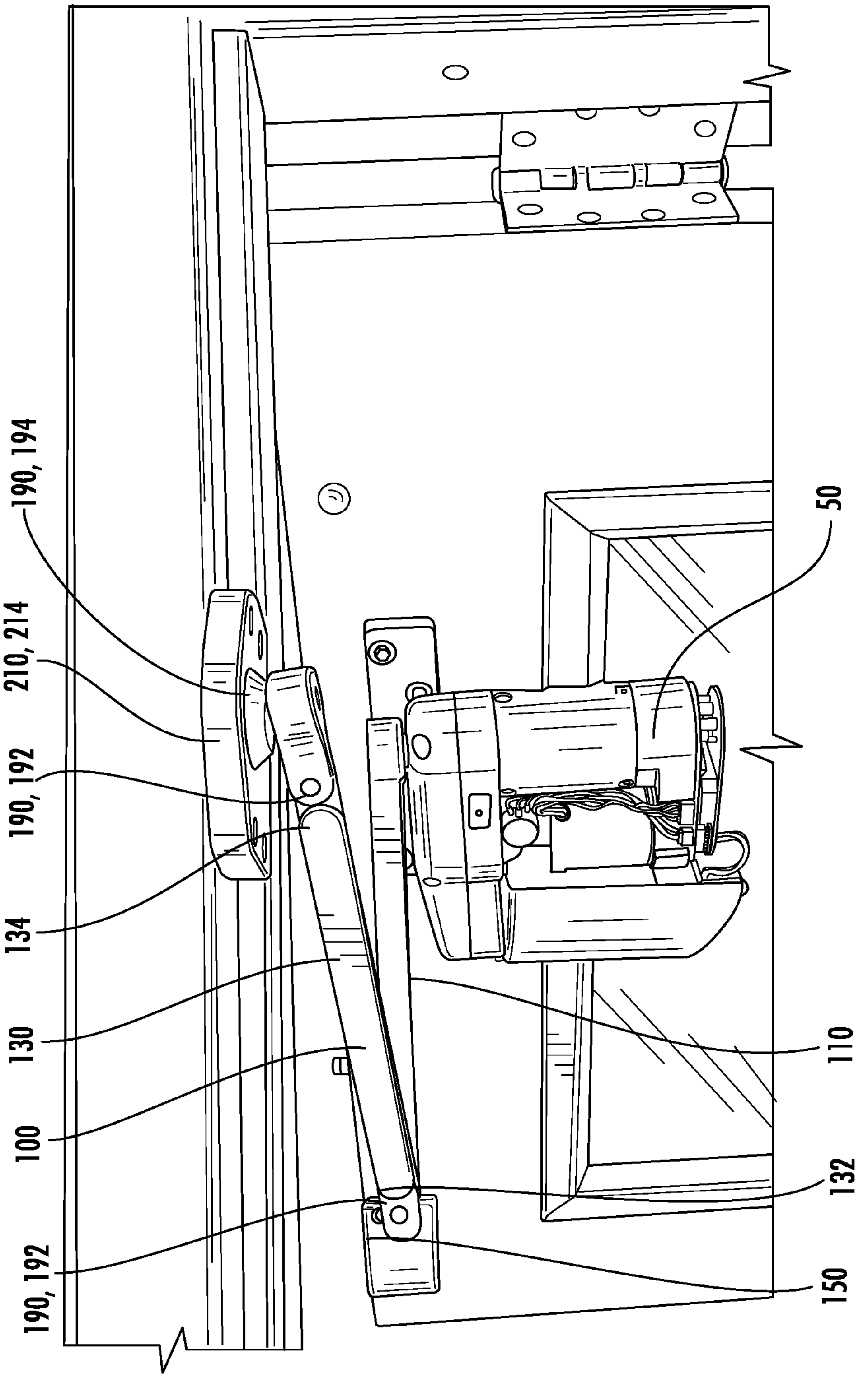
FIG. 20 is a perspective view of the door system having the one or more alignment joints when the door is in an open position, in accordance with some embodiments of the present disclosure.
Figure 21:
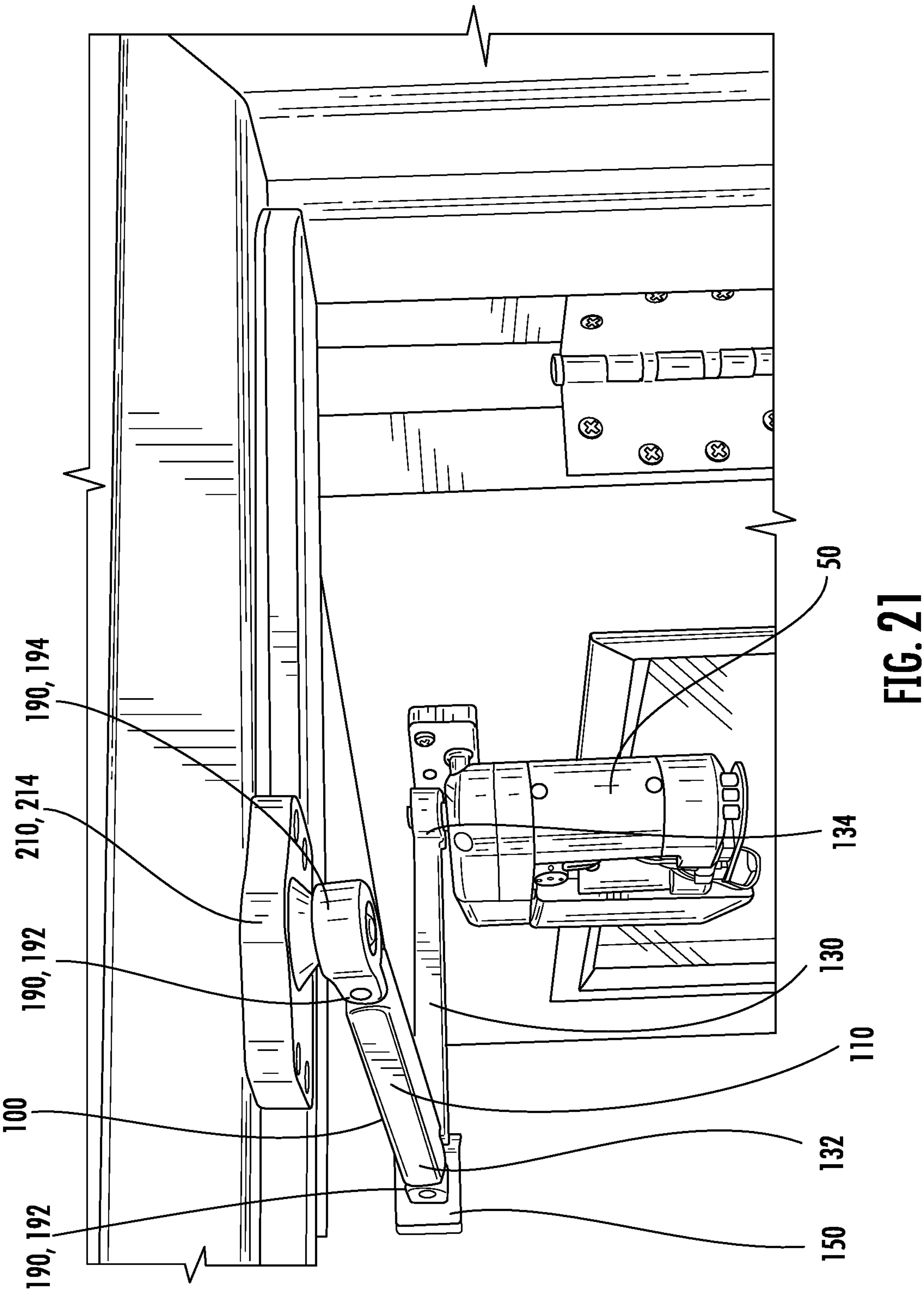
FIG. 21 is a perspective view of the door system having the one or more alignment joints when the door is in an open position, in accordance with some embodiments of the present disclosure.

FIGS. 19 through 21 illustrate other embodiments of the linkage assembly 100 that may allow for misalignment of the door system 50 and/or linkage arms 110, 130. As such, it should be understood that the drive arm 110 and/or the attendant arm 130 may have one or more adjustment joints 190 (e.g., pivot joints, ball joints, or the like). In particular, as illustrated in FIGS. 19 through 21, the door system 50 may have a pivot joint 192 located adjacent the proximal attendant end 132 of the attendant arm 110. Moreover, as illustrated in FIGS. 19 through 21, the distal attendant end 134 of the attendant arm 130 may have an adjustment joint 190, such as a pivot joint 192 and/or a ball joint 194. The pivot joint 192 may allow for movement and/or misalignment in a single direction (e.g., a vertical direction), while preventing movement and/or misalignment in another direction (e.g., a horizontal direction). Alternatively, the ball joints 194 may allow for movement and/or misalignment in any direction (e.g., horizontal direction, vertical direction, rotation, or the like). While the distal attendant end 134 of the attendant arm 130 is illustrated as having both a pivot joint 192 and a ball joint 194, it should be understood that the distal attendant end 134 may only have a pivot joint 192 or a ball joint 194. It should be further understood that while the one or more adjustment joints 190 are illustrated as being located adjacent the proximal attendant end 132 and/or the distal attendant end 134 of the attendant arm 130, the one or more adjustment joints 190 may be located adjacent the proximal drive end 112 and/or the distal drive end 114 of the drive arm 110. Moreover, it should be understood that one or more adjustment joints 190 may be located on the drive arm 110 and the attendant arm 130. Furthermore, while the adjustment joints 190 are illustrated and/or described as being located adjacent the ends 112, 114, 132, 134 of the arms 110, 130, it should be understood that the adjustment joints 190 may be located at any location along the length of the arms 110, 130. The one or more adjustment joints 190 allow for small or large misalignment of the door system 50 while limiting (e.g., reducing, eliminating) any loss of the transfer of force through the linkage assembly 100, and in particular through the gear joint 150.

It should be understood that the door system 50, and in particular the linkage assembly 100, of the present invention allows for improved installation and operation of the door system 50. The present door system 50 is easily installed without expert knowledge on the push side 12 or pull side 14 of a door that has a left hand swing or a right hand swing. Moreover, the gear joint 150 facilitates the transfer of the forces (e.g., torque) from the motor 62 to the drive arm, through the gear joint 150, to the attendant arm 130 and to the door frame 20, wall 30, or the like to reduce the binding of the door system 50, or the like. For example, when the motor 62 of the door system 50 is activated, the door housing 52 (e.g., through the housing mounting bracket 212) provides a resulting reaction force to the door 10 when mounted to the door. Moreover, the torque from the drive unit 66 (e.g., output drive shaft) is applied to the gear joint 150. The reaction force is then applied to the door frame 20 or wall 30 through the distal attendant arm 134 and the arm mounting bracket 214.

Figure 22:
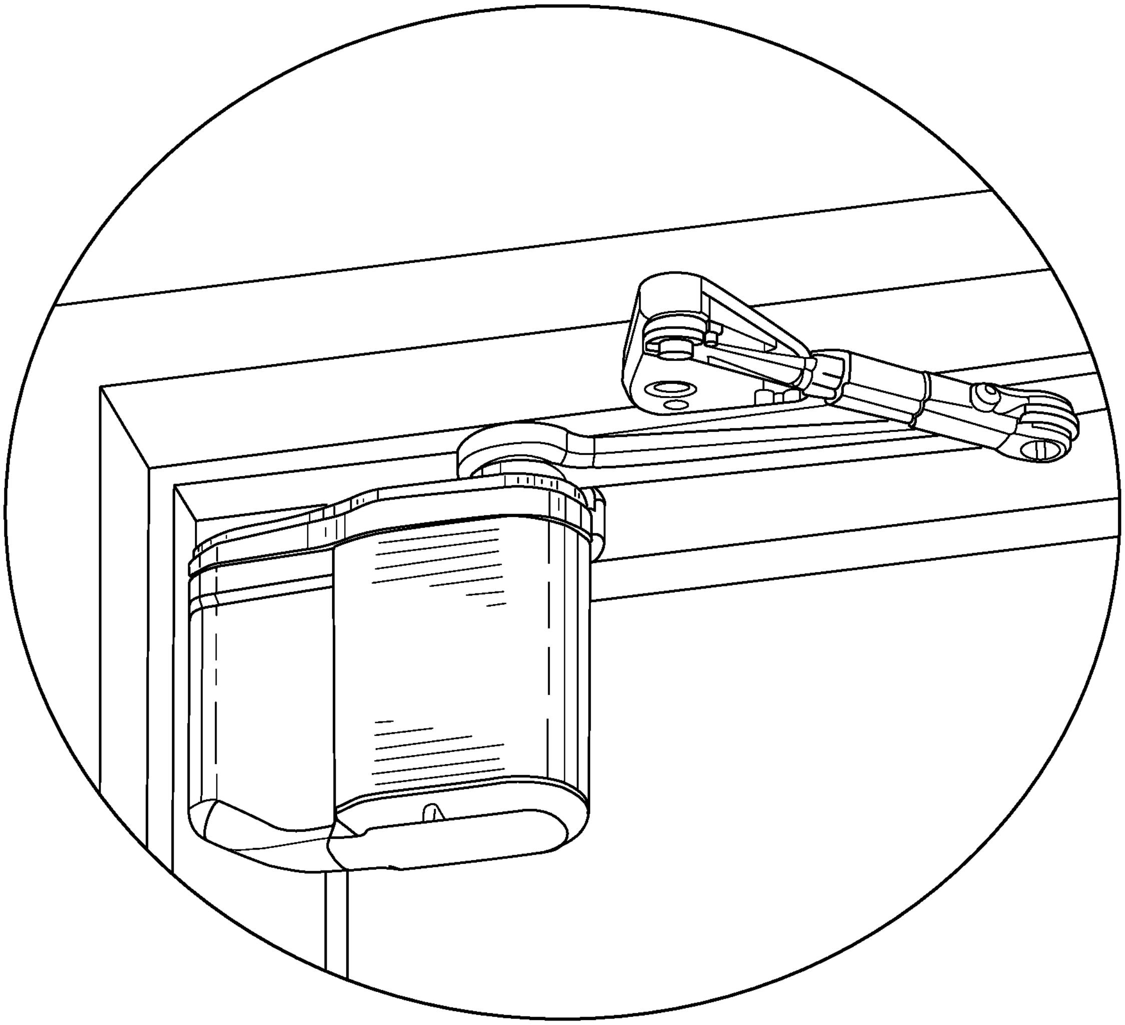
FIG. 22 (Prior Art)
FIG. 22 is a perspective view of a conventional door system having pin joints and linkages located at an angle with respect to each other.

In traditional linkage assemblies, as illustrated in FIG. 22, the arms are positioned at angles with respect to each other and pin joints (e.g., one arm on top of another arm, a channel and slot connection, or the like) are used where the arms are secured together (e.g., at the knuckle). Because of the pin joint in traditional linkages, the door systems can only transmit tension and compression through the pin joint, and not the torque provided by the motor. In traditional linkages when both arms are parallel with the door and upper frame, the force transmitted through the secondary driven arm (e.g., when it is located parallel to the door and frame) results in a force vector pointing parallel to the door and no torque is transmitted to cause the door to move in the opening direction. This can be corrected in traditional linkages by adjusting the linkage geometry so the secondary arm is not parallel to the door. However, because of the free play in the pin joint of the linkages and, free play in the mounting locations, or the like, the force from the driving primary arm causes the joint to move toward the face of the door and causes the secondary arm to become more parallel to the door. The force vector is parallel to the secondary driven arm and the result is that most of the force being applied to open the door is actually directed toward the frame at the latch side of the frame. Any play in the system that allows door movement results in the door being forced into the frame immediately upon opening of the door when it is in the closed position. The resulting friction force can cause the door to jam and not be able to open. In these situations, the more torque that is applied to open the door only increases the friction force, thus making it more likely to prevent the door from being opened. This problem occurs until the secondary arm is rotated far enough that the force causing the door to open is equal to the force being applied to move the door into the frame. In conventional configurations of the linkages, in order for the correct force to be applied for opening the door properly without jamming, the drive arm and the second arm attached to the drive arm have to be located at approximately 45 degrees, as illustrated in FIG. 22. Moreover, in this configuration (at 45 degrees), the conventional configuration requires long door arms that protrude objectionably away from the face of the door frame in order to open past 90 degrees as compared to the linkage assembly 100 of the present invention (e.g., when door arms of the present invention and the door arms of the conventional configurations are the same length) that allows for approximately 135 degrees of opening the door (e.g., +/−1, 2, 3, 4, 5, 6, 7, 8, 9, 10, or the like degrees). In order for the door of conventional configurations to be opened past 90 degrees, the driven arm may be required to be over 24 inches long, and the second arm may be over 12 inches long. This creates an unsightly configuration for the linkage arms of conventional configurations when they are installed.

Unlike conventional door systems, the present door system 50 has an improved linkage assembly 100, including the improved gear joint 15, because of the improved transmission of torque through the gear joint 150. As such, the linkage arms 110, 130 can be located parallel with each other and tucked underneath the frame 20 (e.g., when installed on the push side 12 of the door 10) or located parallel close to the frame 20 or wall 30 (e.g., when installed on the pull side 14 of the door 10), and in both configurations the linkage assembly 100 maintains opening of the door past 90 degrees (e.g., to approximately 135 degrees, or the like) without having arms positioned at an angle to each other and without using excessively long arms.

FIG. 23 illustrates a process 300 of installing and/or utilizing the door system 50 described herein. It should be understood that the installation steps of the process 300 described herein may be performed in any order depending on the installer, the door height, width, or the like on which the door system 50 is being installed, or the location on the door 10, door frame 20, and/or wall 30 on which the door system 50 is being installed. As illustrated in block 302 of FIG. 2, the door system housing 52, housing mounting bracket 212, and/or the components thereof are installed onto the door 10, such as the push side 12 or pull side of the door 14. Alternatively, the door housing 52, housing mounting bracket 212, and/or the components thereof may be installed on the door frame 20 (e.g., outer face of the door frame 20) or the wall 30 (e.g., above the door frame 20). It should be understood that the door system housing 52 may be mounted on left hand swinging doors 10 or right hand swinging doors. As such, depending on the door width and height, location of the door assembly 1 (e.g., close to a wall, ceiling, other features) or customer preferences, a range of mounting arrangements may be contemplated.

Block 304 of FIG. 23 further illustrates that the linkage assembly 100 is created by forming the gear joint 150. That is, the proximal drive end 112 having the drive teeth 182 of the drive arm 110 is assembled to the gear housing 152 (e.g., the base housing 154). For example, the proximal drive end aperture 116 with the first bearing 162 is placed over the first pin 172 in the gear housing 152 (e.g., the base housing 154). Moreover, the proximal attendant end 132 having the attendant teeth 184 of the attendant arm 130 is assembled to the gear housing 152 (e.g., the base housing 154) and/or the proximal drive end 112 having the drive teeth 182. For example, the proximal attendant end aperture 136 with the second bearing 164 is placed over the second pin 174 in the gear housing 152 (e.g., base housing 154) and the attendant teeth 184 are interlocked with the drive teeth 182. In some embodiments it should be understood that the drive teeth 182 and the attendant teeth 184 are interlocked, and the drive arm 110 and attendant arm 130 are assembled to the gear housing 152 (e.g., base housing 154) at the same time. In the embodiments where a base housing 154 is utilized, once the arms 110, 130 are assembled to the base housing 154 the cover housing 156 may be assembled to the base housing 154. In some embodiments, the linkage assembly 100 including the gear joint 150 may be sent pre-assembled before the door system 50 is sent to a customer.

FIG. 23 further illustrates in block 306 that the distal drive end 114 is operatively coupled to the drive assembly 60, such as to the drive unit 66, and more particularly the drive shaft of the drive assembly 60. As illustrated in the figures, the distal drive end 114 may have a shaft aperture 118 located therein. As illustrated the drive shaft 66 may be generally triangular in shape, with the shaft aperture 118 having a mating triangular aperture. In other embodiments the invention, the distal drive end 114 may be operatively coupled to the drive assembly 60 in another way, such as through another type of joint having any type of shape and configuration (e.g., square, pentagon, hexagon, heptagon, octagon, any other polygonal shape, or the like shafts and/or apertures).

FIG. 23 further illustrates in block 308, that an arm mounting bracket 214 is installed on the door frame 20 or the wall 30. For example, when the door system 50 is being mounted on the push side 12 of the door 10 (e.g., through a housing mounting bracket 212), the arm mounting bracket 214 may be mounted to the underside of the door frame 20. Alternatively, when the door system 50 is being mounted on the pull side 14 of the door 10, the arm mounting bracket 214 may be mounted to the outer face of the frame 20 or the wall 30.

Furthermore, as illustrated in bock 310, the distal attendant end 134 of the attendant arm 110 is operatively coupled to the arm mounting bracket 214. As previously discussed herein, the joint between the distal attendant end 134 and the arm mounting bracket 214 may comprise a ball joint to allow for misalignment in the mounting of the door system 50 to the door 10, door frame 20, and/or wall 30. However, it should be understood that any type of joint that transmits torque may be used for the operative coupling of the distal attendant end 134 of the attendant arm 130 to the arm mounting bracket 214.

Block 312 of FIG. 23 further illustrates that the door system 50 may be programmed for operation. For example, the installer or another user may program the door using an interface (e.g., screen, controls, buttons, switches, or the like) on the door system 50 or through communication between a user computer system (e.g., mobile device, such as smartphone, tablet, laptop, or the like) communicating with the user computer system wirelessly or through a wired connection.

FIG. 23 further illustrates that the door system 50 operates, as described herein, by transferring the forces (e.g., torque) from the drive assembly 60, through the linkage assembly 100, in particular the gear joint 150, and to the door frame 20, wall 30, or door 10 depending on how the door system 50 is installed on the door 10.

It should be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more."

It should be understood that when using the terms "parallel" or "perpendicular" this terms may include components being exactly parallel or perpendicular, or may include generally parallel or perpendicular (e.g., within 1, 2, 3, 4, 5, 6, 7, 8, 9, 10, 12, 15, or the like degrees between the components).

It should be understood that "operatively coupled," when used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A door system comprising:

a door system housing, wherein the door system is operatively coupled to a door, a door frame, or a wall;

a motor located at least partially within the door system housing;

a linkage assembly comprising:

a drive arm having a distal drive end and a proximal drive end, wherein the proximal drive end has drive teeth; and an attendant arm having a distal attendant end and a proximal attendant end, wherein the proximal attendant end has attendant teeth;

wherein the drive teeth and the attendant teeth are operatively coupled together in a gear joint to allow the transfer of torque from the drive teeth to the attendant teeth which moves the attendant arm and the drive arm with respect to each other; and wherein the distal drive end of the drive arm is operatively coupled to the motor and the distal attendant end of the attendant arm is operatively coupled to the door, the door frame, or the wall.

2. The door system of claim 1, wherein when the door system is operatively coupled to a push side of the door the distal attendant end of the attendant arm is operatively coupled to the door frame.

3. The door system of claim 1, wherein when the door system is operatively coupled to a pull side of the door the distal attendant end of the attendant arm is operatively coupled to the door frame or the wall.

4. The door system of claim 1, wherein when the door is operatively coupled to the door frame or the wall, the distal attendant end of the attendant arm is operatively coupled to the door.

5. The door system of claim 1, wherein the door system is operatively coupled for left hand swing or right hand swing of the door.

6. The door system of claim 1, wherein the drive arm or the attendant arm has a pivot joint for vertical movement at any location on the drive arm or the attendant arm.

7. The door system of claim 1, wherein the distal attendant end of the attendant arm has a ball joint that is operatively coupled to a mounting bracket.

8. The door system of claim 1, wherein at least a portion of the drive arm is angled adjacent the distal drive end to allow for alignment of at least another portion of the drive arm and the attendant arm when the door is closed.

9. The door system of claim 1, wherein at least a portion of the drive arm and the attendant arm are parallel when the door is closed.

10. The door system of claim 1, wherein the gear joint allows the door to open past 90 degrees open.

11. The door system of claim 1, wherein the gear joint comprises:

a gear housing having a base housing and a cover housing;

a first bearing operatively coupled within a proximal drive aperture in the proximal drive end of the drive arm;

a second bearing operatively coupled within a proximal attendant aperture in the proximal attendant end of the attendant arm;

a first pin operatively coupled to the gear housing and the proximal drive aperture of the drive arm; and a second pin operatively coupled to the gear housing and the proximal attendant aperture of the attendant arm.

12. The door system of claim 1, wherein the drive teeth and the attendant teeth are chevron teeth, linear teeth, or angular teeth.

13. The door system of claim 1, further comprising:

a mounting bracket operatively coupled to the door frame or the wall, wherein the distal attendant end of the attendant arm is operatively coupled to the mounting bracket, and wherein the mounting bracket is mounted on an outer face of the frame or the wall when the door system is operatively coupled to a pull side of the door.

14. The door system of claim 1, further comprising:

a mounting bracket operatively coupled to the door frame or the wall, wherein the distal attendant end of the attendant arm is operatively coupled to the mounting bracket, and wherein the mounting bracket is mounted on a lower face of the door frame when the door system is operatively coupled to a push side of the door.

15. A door assembly, the door assembly comprising:

a door frame;

a door operatively coupled to the door frame;

a door system operatively coupled to the door, the door frame, or a wall, wherein the door system comprises:

a door system housing;

a motor located at least partially within the door system housing;

a linkage assembly comprising:

a drive arm having a distal drive end and a proximal drive end, wherein the proximal drive end has drive teeth; and an attendant arm having a distal attendant end and a proximal attendant end, wherein the proximal attendant end has attendant teeth;

wherein the drive teeth and the attendant teeth are operatively coupled together in a gear joint to allow the transfer of torque from the drive teeth to the attendant teeth which moves the attendant arm and the drive arm with respect to each other; and wherein the distal drive end of the drive arm is operatively coupled to the motor and the distal attendant end of the attendant arm is operatively coupled to the door, the door frame, or the wall.

16. The door assembly of claim 15, wherein at least a portion of the drive arm is angled adjacent the distal drive end to allow for parallel alignment of at least another portion of the drive arm and the attendant arm when the door is closed.

17. A method of mounting a door system, wherein the door system comprises a door system housing, a motor located at least partially within the door system housing, and a linkage assembly comprising a drive arm having a distal drive end and a proximal drive end, wherein the proximal drive end has drive teeth and an attendant arm having a distal attendant end and a proximal attendant end, wherein the proximal attendant end has attendant teeth, and wherein the drive teeth and the attendant teeth are operatively coupled together in a gear joint to allow the transfer of torque from the drive teeth to the attendant teeth which moves the attendant arm and the drive arm with respect to each other, and wherein the distal drive end of the drive arm is operatively coupled to the motor, wherein the door system is operatively coupled to a door, or a door frame or a wall, and the distal attendant end of the attendant arm is operatively coupled to the other of the door, or the door frame or the wall, the method comprising:

mounting the door housing to the door or the door frame or the wall; and mounting the distal attendant arm of the linkage assembly having the gear joint to the opposite of the door or the door frame or the wall.

18. The method of claim 17, wherein at least a portion of the drive arm is angled adjacent the distal drive end to allow for parallel alignment of at least another portion of the drive arm and the attendant arm when the door is closed.

19. A method of operating a door system, wherein the door system comprises a door system housing, a motor located at least partially within the door system housing, and a linkage assembly comprising a drive arm having a distal drive end and a proximal drive end, wherein the proximal drive end has drive teeth and an attendant arm having a distal attendant end and a proximal attendant end, wherein the proximal attendant end has attendant teeth, and wherein the drive teeth and the attendant teeth are operatively coupled together in a gear joint to allow the transfer of torque from the drive teeth to the attendant teeth which moves the attendant arm and the drive arm with respect to each other, and wherein the distal drive end of the drive arm is operatively coupled to the motor, wherein the door system is operatively coupled to a door, or a door frame or a wall, and the distal attendant end of the attendant arm is operatively coupled to the other of the door, or the door frame or the wall, the method comprising:

activating the motor to provide a force; and transferring the force of the motor through the gear joint to open or close the door.

20. The method of claim 19, wherein at least a portion of the drive arm is angled adjacent the distal drive end to allow for parallel alignment of at least another portion of the drive arm and the attendant arm when the door is closed.

* * * * *